United States Patent [19]

Olney

[11] 4,236,048
[45] Nov. 25, 1980

[54] ELECTRONIC DEVICE FOR SUBTRACTING SIGNALS AND ASSOCIATED SYSTEM EMPLOYING SUCH DEVICE

[75] Inventor: Richard E. Olney, San Jose, Calif.

[73] Assignee: Fairchild Camera & Instrument Corporation, Mountain View, Calif.

[21] Appl. No.: 1,139

[22] Filed: Jan. 5, 1979

[51] Int. Cl.³ .............................................. H04M 1/58
[52] U.S. Cl. .................................................. 179/81 A
[58] Field of Search .................. 179/81 R, 81 A, 81 B, 179/1 HF, 1 P, 170.2; 343/180

[56] References Cited
U.S. PATENT DOCUMENTS 3,908,094  9/1975  Deluegue ............................ 179/81 A Primary Examiner—Robert S. Tupper
Assistant Examiner—Joseph A. Popek
Attorney, Agent, or Firm—Paul J. Winters; Ronald J. Meetin; Michael J. Pollock

[57] ABSTRACT

An electronic device comprises separate channels for receiving input signals representative of an undesired signal and a composite signal, envelope detectors for detecting amplitude envelopes of signals representative of the input signals, and an electronic subtractor for determining the electronic difference between the envelope signals to produce an output signal indicative of a desired signal. The device is employed particularly for cancelling the effect of the telephone sidetone signal in a telephone to yield an output signal indicative of the telephone maintone signal.

17 Claims, 13 Drawing Figures

BLOCK DIAGRAM

BLOCK DIAGRAM

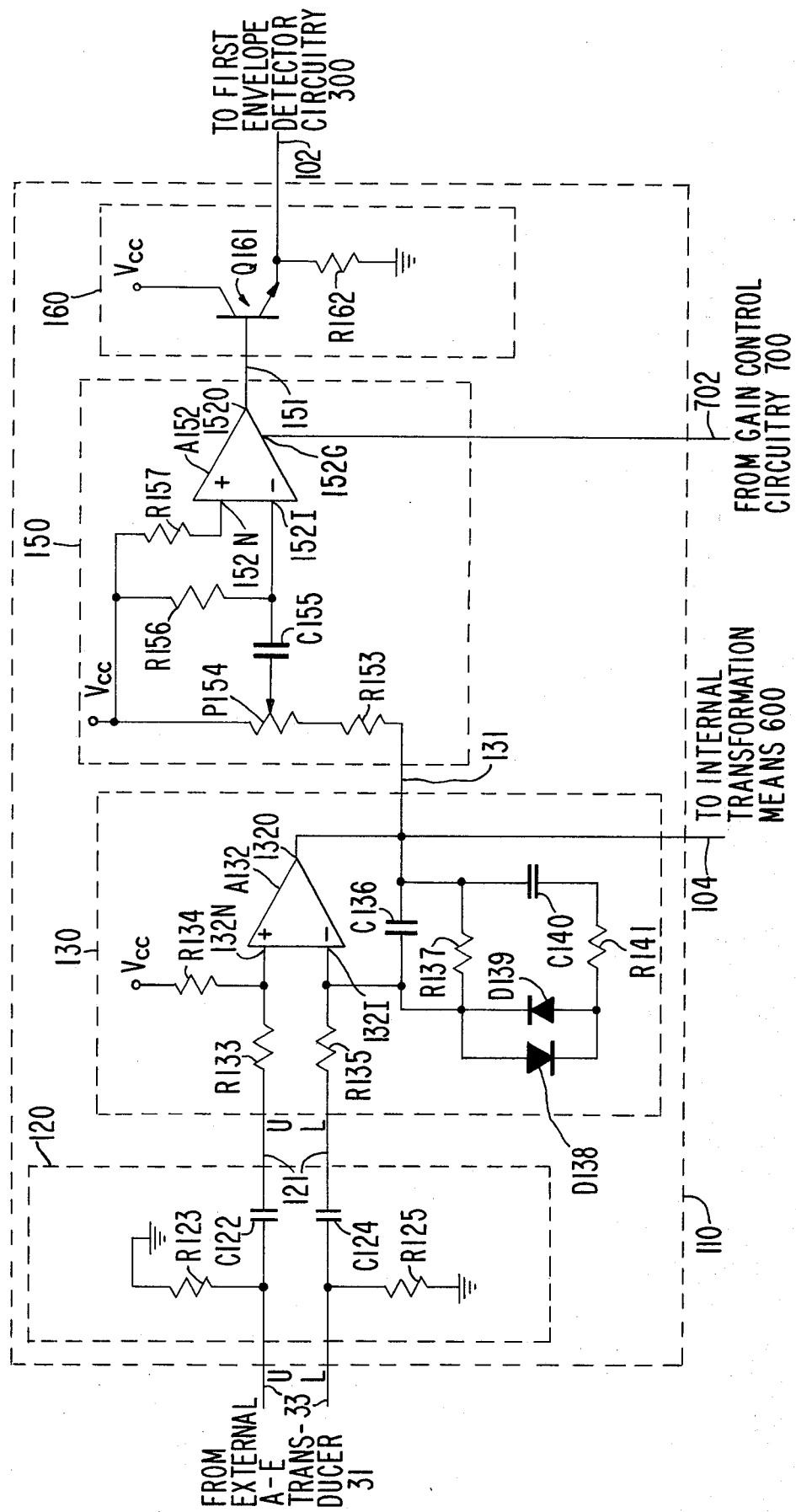
FIG. 3 FIRST MEANS FOR RECEIVING AND TRANSFORMING 100

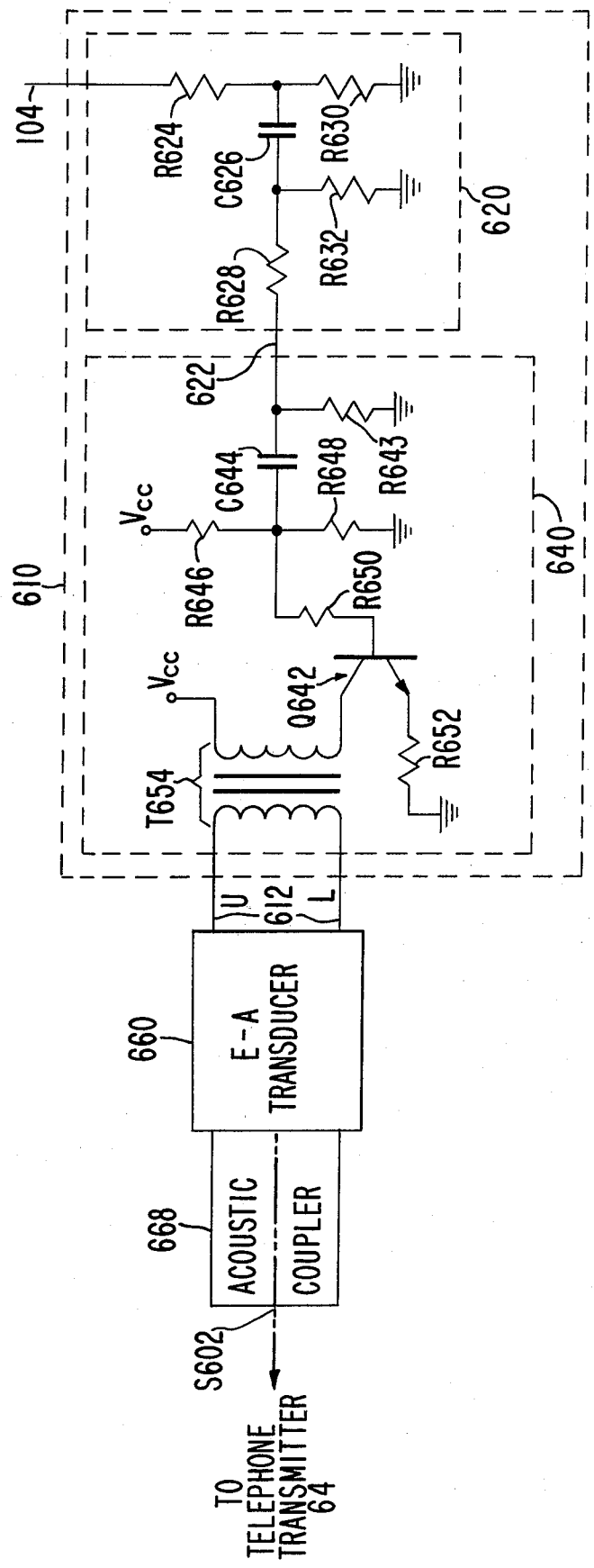

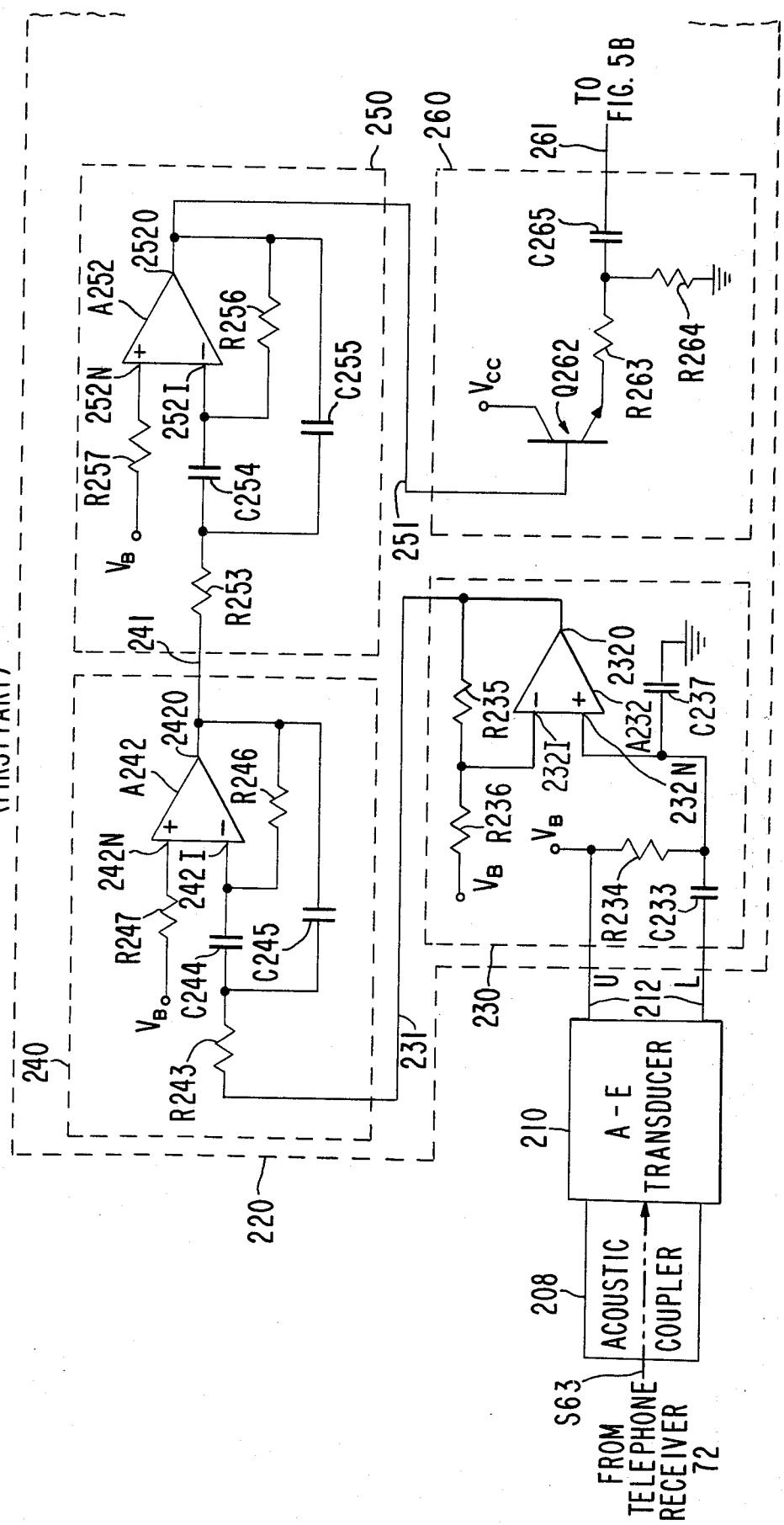

SECOND MEANS FOR RECEIVING AND TRANSFORMING 200 (SECOND PART)

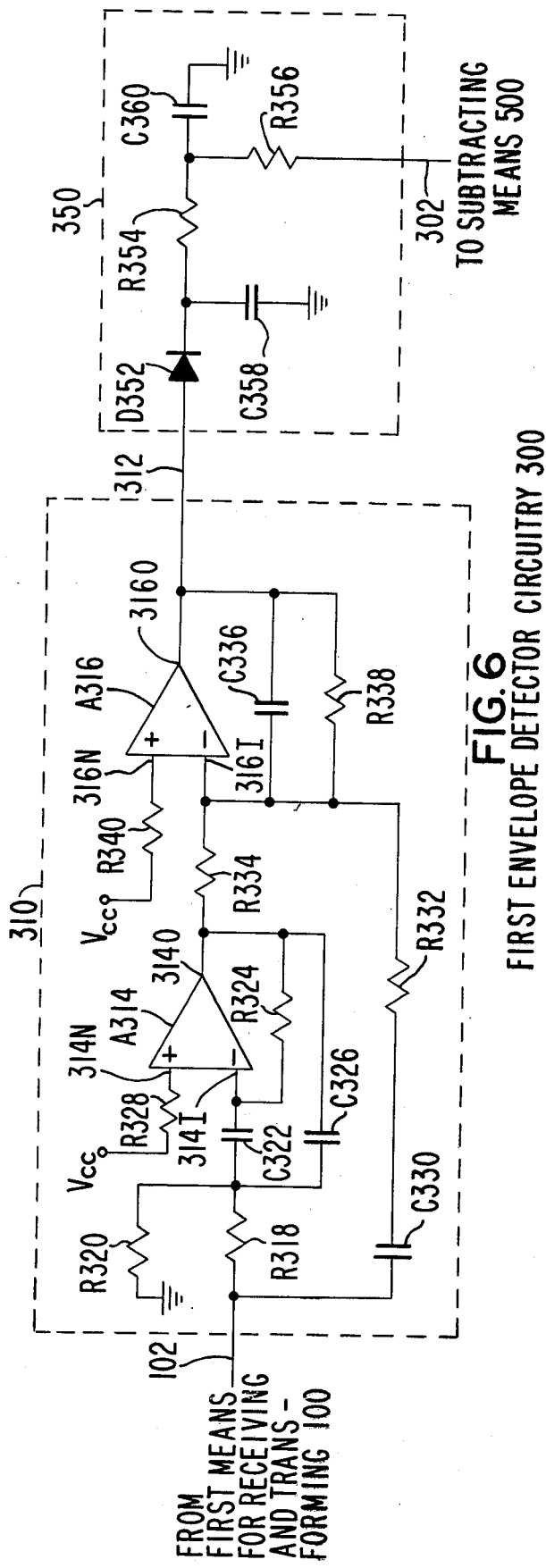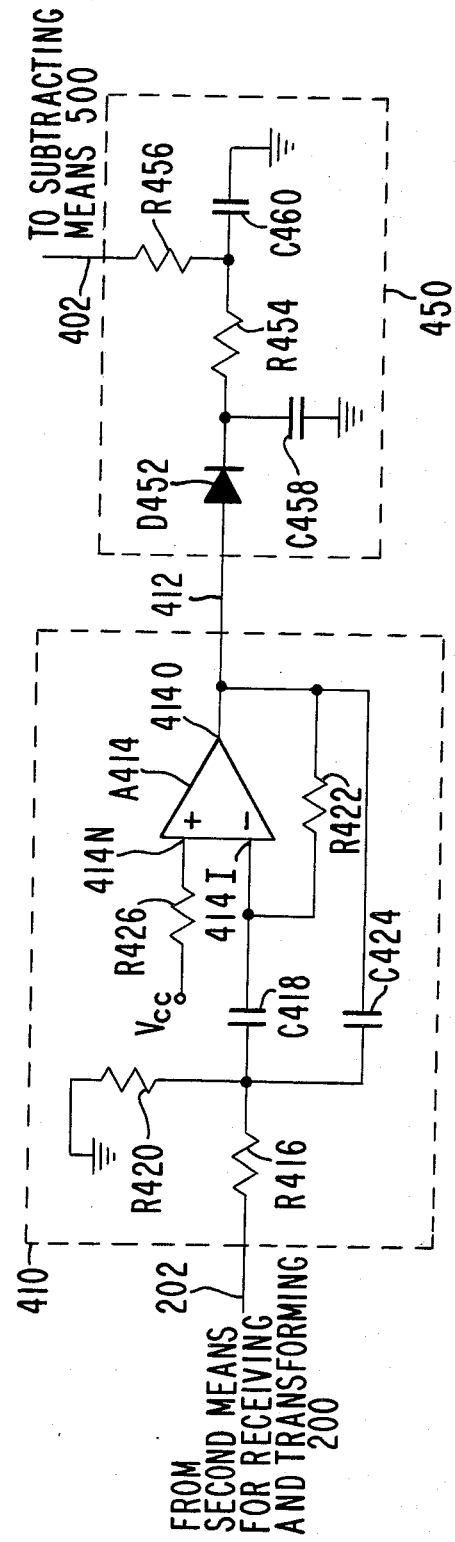
FIG. 6 FIRST ENVELOPE DETECTOR CIRCUITRY 300
FIG. 7 SECOND ENVELOPE DETECTOR CIRCUITRY 400

SUBTRACTING MEANS 500

GAIN CONTROL CIRCUITRY 700

OUTPUT CONDITIONING MEANS 800

POWER SUPPLY 1000

ELECTRONIC DEVICE FOR SUBTRACTING SIGNALS AND ASSOCIATED SYSTEM EMPLOYING SUCH DEVICE

BACKGROUND OF THE INVENTION

1. Field of the Invention

This invention relates to electronic devices for cancelling the effect of an undesired signal from a composite signal.

2. Prior Art

The circuitry associated with a conventional telephone is typically arranged to enable a composite electronic signal representing an additive combination of two acoustic signals to be transmitted to the receiver of the telephone. The composite electronic signal comprises two components which correspond respectively to the two acoustic signals and which may conveniently be termed the sidetone component and the maintone component. The receiver is that part of the telephone which receives the composite electronic signal and converts it into a composite acoustic signal which the telephone user can hear. The telephone user is hereafter generally referred to as the local speaker/listener, and the telephone employed by the local speaker/listener is hereafter generally referred to as the local telephone.

The acoustic signal corresponding to the maintone component is the voice of (or other sounds from) an entity remote to the local telephone. Hereafter, the remote entity is generally referred to as the remote speaker/listener. The acoustic signal of the remote speaker/listener is transformed into an electronic signal and transmitted through a telephone line (or lines) to the local telephone. The electronic signal representing the voice of the remote speaker/listener may be conveniently referred to as the telephone maintone signal.

The acoustic signal corresponding to the sidetone component is the voice (or other sounds from) the local speaker/listener. As the local speaker/listener speaks into (or otherwise has his/her voice conveyed to) the transmitter of the local telephone, the transmitter converts his/her voice into an electronic signal which is normally transmitted to the remote speaker/listener. In addition, the voice of the local speaker/listener is transmitted to the receiver of the local telephone where the local speaker/listener hears his/her own voice. The electronic signal representing the voice of the local speaker/listener carried from the transmitter to the receiver of the local telephone is termed the telephone sidetone signal. Generation of a sidetone signal serves to simulate a person-to-person conversational situation in which an individual hears part of the individual's own voice through the individual's ears.

In the conventional telephone, there is a single electronic path through the receiver for carrying both the maintone and sidetone signals. This arrangement serves to combine the maintone and sidetone signals additively into the composite electronic signal which is received by the receiver.

The sidetone component of the composite signal is typically somewhat reduced in amplitude compared to the amplitude of the actual sidetone signal. The reduction in amplitude is accomplished with a hybrid-coil network connected between the receiver and transmitter of the local telephone. The amount of reduction is controlled by a balancing network connected to the hybrid-coil network. Note that the voice of the local speaker/listener carried from the transmitter to the receiver is normally not completely attenuated in a conventional telephone. That is, the composite electronic signal received at the receiver of the local telephone conventionally always includes a sidetone component representing some actual fraction of the voice of the local speaker/listener.

Hybrid-coil and balancing networks for a conventional telephone are described in *Transmission Systems for Communication* (3d ed., 1964), Bell Telephone Laboratories Staff, Chap. 3, "Voice Frequency Transmission," pages 49–55. Hybrid-coil and balancing networks for a speakerphone, which is analagous to a conventional telephone as far as the hybrid-coil and balancing networks are concerned, are described by W. F. Clemency, *Bell Laboratories Record* (June, 1956), "The Speakerphone," vol. 34, no. 6, pages 208–211. Hybrid-coil networks are further discussed in "Engineering Bulletin, Telephone Coupling Transformers" (1974), Triad-Utrad, Litton Systems Inc. These three references are specifically incorporated by reference herein.

In some situations, it is either desirable or necessary to nullify the effect of the sidetone signal. One potential way for eliminating the effect of sidetone signal is to have the local speaker/listener remain silent during the critical period when the effect of the sidetone signal is to be negated. This solution, however, is not feasible if it is also desirable to have the local speaker/listener remain in a continuous conversation with the remote speaker/listener during the critical period. Furthermore, other sounds near the local speaker/listener that are transmitted into the receiver of the local telephone become the sidetone signal.

Another possible solution would be to break into the local telephone and attach appropriate circuitry between the receiver and transmitter to attenuate the sidetone signal completely. This solution, however, is unattractive because it may involve causing physical damage to the local telephone. In addition, breaking into the telephone and attaching the appropriate circuitry to eliminate the sidetone signal would often require more time to implement than is acceptable.

What is needed is a simple, but effective, device that can quickly be attached to the local telephone for cancelling the effect of the telephone sidetone signal without causing any physical damage to the local telephone.

SUMMARY OF THE INVENTION

An electronic game in a television studio is coupled to a telephone located in the general vicinity of the electronic game. The electronic game is responsive to a signal indicative of the voice of a member of the television home audience transmitted over a telephone line to the studio telephone. The member of the home audience typically watches the electronic game on a television located near the home participant. Also located near the home participant is a sound-transmission mechanism, such as a second or remote telephone, which is connected to the telephone line. At a selected time, the member of the home audience speaks into the sound-transmission mechanism, and the voice of the home participant is thereby transmitted to the studio telephone to generate the signal for actuating the electronic game.

The studio telephone is termed the local telephone, the member of the home audience is termed the remote speaker/listener, and the electronic signal on the telephone line representing the voice of the member of the home audience is the maintone signal.

The master of ceremonies (hereafter emcee) at the television studio typically carries on a conversation with the remote speaker/listener in the home audience. This is typically done by having the emcee speak into a microphone and having the output of the microphone fed into the transmitter of the local telephone. As a result, in addition to being transmitted to the remote speaker/listener, the emcee's voice is transformed into the sidetone signal on the local telephone. To prevent the emcee, who is the local speaker/listener, from actuating the electronic game through the sidetone signal, the effect of the sidetone signal is cancelled so that the electronic game responds solely to the voice of the remote speaker/listener from the home audience.

In accordance with this invention, an electronic device for generating a primary output electronic signal indicative of a difference between the first input signal and a second input signal comprises two channels for electronically operating on the first and second input signals. The first channel has first means for receiving the first input signal and for transforming the first input signal into a first intermediate electronic signal representative of the first input signal. The second channel likewise has second means for receiving the second input signal and for transforming the second input signal into a second intermediate electronic signal representative of the second input signal. The first means for receiving and transforming and the second means for receiving and transforming are generally referred to hereafter simply as the first means and the second means, respectively. First envelope detector circuitry in the first channel detects the amplitude envelope of the first intermediate signal to produce a third intermediate electronic signal representative of the amplitude envelope of the first intermediate signal. Similarly, second envelope detector circuitry in the second channel detects the amplitude envelope of the second intermediate signal to produce a fourth intermediate electronic signal representative of the amplitude envelope of the second intermediate signal. Subtracting means electronically subtracts the third intermediate signal from the fourth intermediate signal to produce the primary output signal which is indicative of the difference between the third and fourth intermediate signals and accordingly is indicative of the difference between the input signals.

The device is particularly used for recovering a desired signal from a composite signal comprising the desired signal and an undesired signal. In this application, the first input signal is a signal representative of the undesired signal. The second input signal is a composite signal representative of an additive combination of the undesired and desired signals. The undesired and desired signals are combined additively through an external combining device. The primary output signal which results from feeding the first and second input signals into the device is thereby indicative of the desired signal.

More particularly, the present device is employed with a conventional telephone for cancelling the effect of the sidetone signal of the telephone. The telephone employed with the sidetone cancelling device is referred to as the local telephone. The undesired and desired signals are first and second acoustic signals, respectively. For example, the first acoustic signal may be the voice of a local speaker/listener such as the emcee in a television studio. The second acoustic signal is then the voice of a remote speaker/listener such as a member of the television home audience.

The telephone sidetone signal is representative of the first acoustic signal. The first acoustic signal is normally operated upon to produce a third acoustic signal which is fed into the transmitter of the local telephone to generate the telephone sidetone signal. For example, the local speaker/listener may speak into a microphone to generate a representative electronic signal which is conveyed to the vicinity of the local telephone and converted back into an acoustic signal representative of the voice of the local speaker/listener. The telephone maintone signal is representative of the second acoustic signal. The telephone maintone and sidetone signals are combined in the local telephone, and the resultant composite electronic signal is transmitted to the telephone receiver to become a fourth acoustic signal which is also the second input signal.

In a preferred embodiment, the first means also produces an internal electronic signal representative of the first input signal. Internal transformation means receive this internal signal and transform it into a secondary output signal representative of the internal signal. This secondary output signal is the third acoustic signal which is receivable by the telephone transmitter.

The telephone transmitter is coupled to the internal transformation means of the device with a first acoustic coupler. Likewise, the telephone receiver is coupled to the second means with a second acoustic coupler. The internal transformation means has an electronic-to-acoustic transducer for producing the third acoustic signal. The second means includes an acoustic-to-electronic transducer for receiving the fourth acoustic signal.

The first means, the internal transformation means, and the second means include signal conditioning circuitries for appropriately conditioning signals received by the various means. Common gain control circuitry may be connected between the first and second means for controlling amplification gains in the first and second means.

In the foregoing embodiment, the primary output signal is thus indicative of the second acoustic signal from the remote speaker/listener substantially independent of the first acoustic signal from the local speaker/listener.

In a preferred embodiment, the present device further includes output conditioning means for further conditioning the primary output signal to produce a conditioned primary output electronic signal suitable for output usage. The conditioned primary output signal may then be fed into an output device which is responsive to the conditioned primary output signal. For example, the output device may be an electronic game located in a television studio and capable of being activated in response to the voice of the remote speaker/listener transmitted over a telephone line to the receiver of the local telephone in the television studio.

Optionally, the second means may also be operable for producing an internal electronic signal representative of the second input signal. Audio amplifier circuitry receives this internal signal and transforms it into one or more secondary output signals. These secondary output signals are each representative of the internal signal from the second means and thus representative of an additive combination of the first and second acoustic signals. One of these secondary output signals may then be fed to auxiliary broadcasting equipment for transmission, for example, to a television home audience. Another of these secondary output signals may be fed to an external electronic-to-acoustic transducer to reproduce the first and second acoustic signals locally.

The present electronic device is highly effective for cancelling the effect of an undesired signal from a composite signal containing both the undesired signal and a desired signal. In a preferred embodiment, the device is easily connected to a local telephone. Since acoustic couplers are employed for engaging the local telephone, there is no need to break into the local telephone physically and possibly damage it. Connection to the local telephone can be accomplished virtually as fast as placing the hand set of the local telephone on the main body of the local telephone.

The local speaker/listener whose voice is transmitted as the sidetone signal over the local telephone and the remote speaker/listener whose voice is transmitted as the maintone signal over the local telephone may engage in conversation during operation of the sidetone cancelling device. This conversation may be transmitted to one or more external broadcasting devices for others to hear. There is no need for the local speaker/listener to remain silent during the critical actuation time period of an electronic game or other output device responsive to the voice of the remote speaker/listener or to otherwise eliminate the voice of the local speaker/listener. The primary output signal is indicative of the voice of the remote speaker/listener substantially irrespective of what may be said by the local speaker/listener.

BRIEF DESCRIPTION OF THE DRAWINGS

FIG. 3 is a circuit diagram of an embodiment of the first means for receiving and transforming for use in the device of FIG. 2.

FIG. 4 is a circuit and block diagram of an embodiment of the internal transformation means for use in the device of FIG. 2.

FIGS. 5A and 5B are a block and circuit diagram of an embodiment of the second means for receiving and transforming for use in the device of FIG. 2.

FIG. 6 is a circuit diagram of an embodiment of the first envelope detector circuitry for use in the device of FIG. 2.

FIG. 7 is a circuit diagram of an embodiment of the second envelope detector circuitry for use in the device in FIG. 2.

Like reference symbols are employed in the drawings to represent the same item or items in the various drawings and in the description of the preferred embodiments.

DESCRIPTION OF THE PREFERRED EMBODIMENTS

Figure 1:
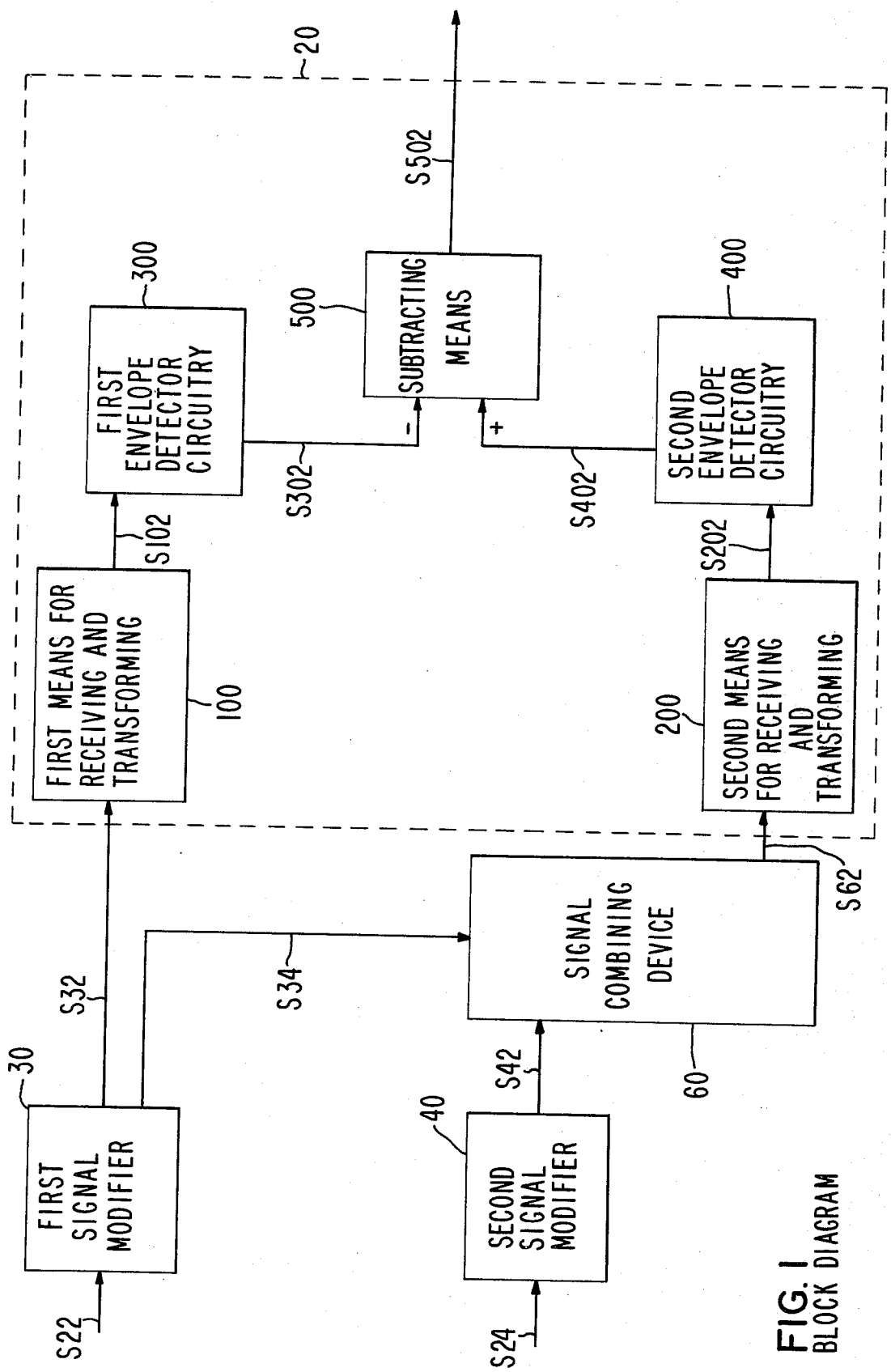
FIG. 1 is a block diagram of the major components for device in accordance with the present invention.

Referring to the drawings, FIG. 1 shows a block diagram of the major components for an electronic device in accordance with the present invention. The device is labelled as item 20 and includes those components within the dashed line. Also shown in FIG. 1 are other devices which operate on signals feeding into device 20.

Figure 2:
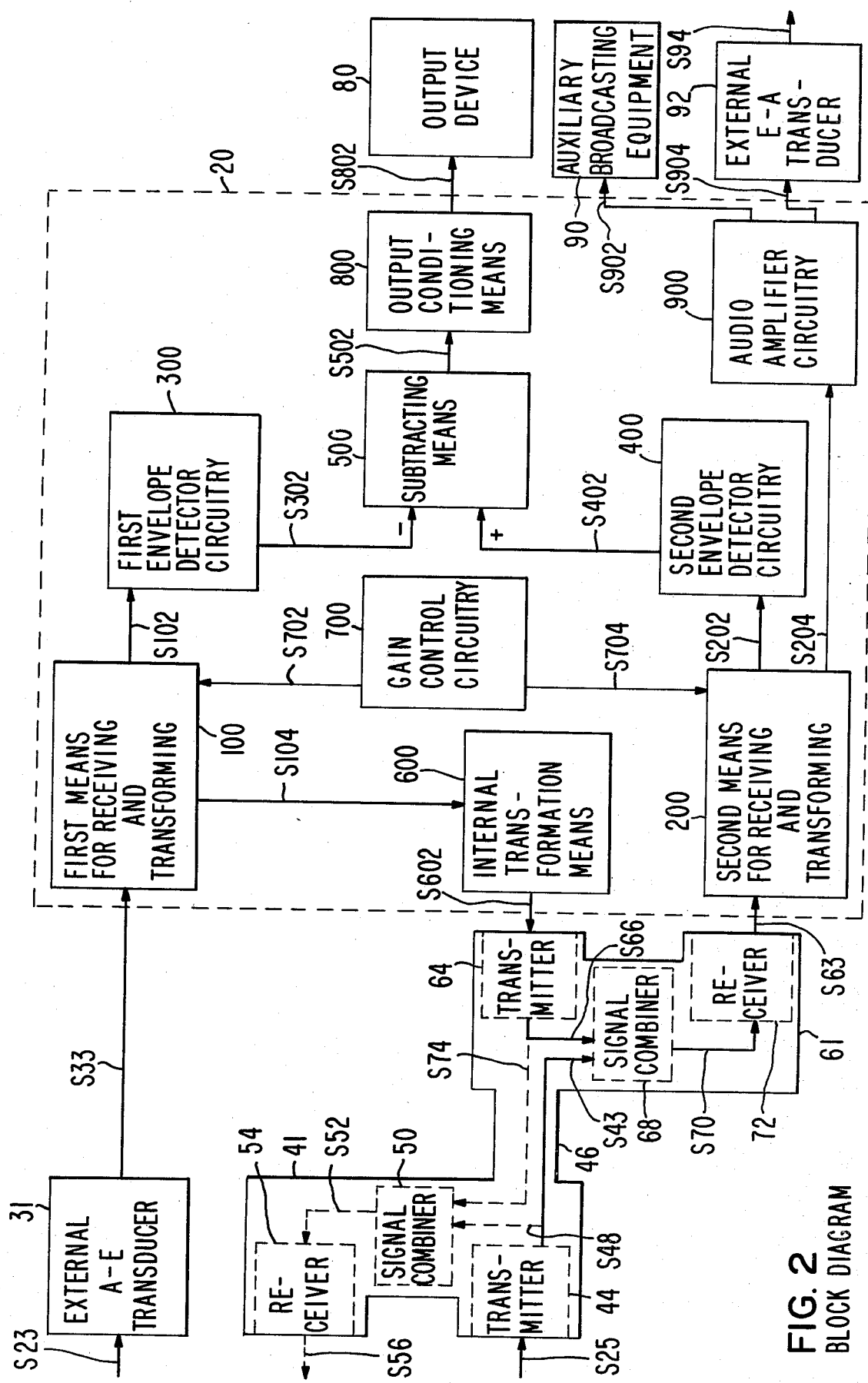
FIG. 2 is a block diagram of the major components of an electronic device for use with a telephone in accordance with the present invention.

"S" as the first character of a reference number indicates that the referenced item is a signal. In FIGS. 1 and 2, the transmission paths through the transmission media for the various signals are shown as arrows. For convenience in describing the invention, each arrow is labelled with the reference number for the appropriate signal being transmitted by the transmission path represented by the arrow.

As illustrated in FIG. 1, device 20 receives input signals generated externally from a first signal S22 and a second signal S24 and operates to produce a primary output electronic signal S502 which is indicative of second signal S24 substantially independent of first signal S22. External to device 20, a first signal modifier 30 receives first signal S22 and produces a first input signal S32 that is representative of first signal S22. First input signal S32 then feeds into device 20. First signal modifier 30 may also produce an external signal S34 that is likewise representative of first signal S22. A second signal modifier 40 receives second signal S24 and produces an external signal S42 that is representative of second signal S24. A signal combining device 60 receives and additively combines external signals S34 and S42 to produce a second input signal S62 which is representative of an additive combination of first and second external signals S34 and S42. Since external signal S34 is representative of first signal S22 and external signal S42 is representative of second signal S24, second input signal S62 is thereby representative of an additive combination of first and second signals S22 and S24. Second input signal S62 then feeds into device 20.

In terms of desired and undesired signals, signal S22 may be viewed as the undesired signal, and signal S24 may be viewed as the desired signal. The signals feeding into device 20 therefore include first input signal S32 which is representative of the undesired signal (S22) and second input signal signal S62 which is a composite signal representative of an additive combination of the undesired and desired signals (S22 and S24). Device 20 then operates to produce an output signal (S502) indicative of the desired signal (S24).

Device 20 has two channels. The first channel is for operating on first input signal S32 and includes first means for receiving and transforming 100 (hereafter generally referred to simply as first means 100) and first envelope detector circuitry 300. The second channel is for operating on second input signal S62 and includes second means for receiving and transforming 200 (hereafter generally referred to simply as second means 200) and second envelope detector circuitry 400. The two channels feed into subtracting means 500 within device 20.

In the first channel, first means 100 receives first input signal S32 and transforms first input signal S32 into a first intermediate electronic signal S102 representative of first input signal S32. Similarly, in the second channel, second means 200 receives second input signal S62 and transforms second input signal S62 into a second intermediate electronic signal S202 representative of second input signal S62.

In the first channel, first envelope detector circuitry 300 detects the amplitude envelope of first intermediate signal S102 and produces a third intermediate electronic signal S302 representative of the amplitude envelope of first intermediate signal S102. Likewise, in the second channel, second envelope detector circuitry 400 detects the amplitude envelope of second intermediate signal S202 and produces a fourth intermediate electronic signal S402 representative of the amplitude envelope of second intermediate signal S202.

Subtracting means 500 electronically subtracts third intermediate signal S302 from fourth intermediate electronic signal S402 to produce primary output electronic signal S502 which is indicative of the electronic difference between third intermediate signal S302 and fourth intermediate signal S402. Since fourth intermediate signal S402 is representative of the amplitude envelope of second intermediate electronic signal S202 which, in turn, is representative of an additive combination of first and second signals S22 and S24, and since third intermediate signal S302 is representative of the amplitude envelope of first intermediate signal S102 which, in turn, is representative of first signal S22, primary output signal S502 is thereby indicative of second signal S24 substantially independent of first signal S22. Primary output signal S502 may be utilized directly to operate an output device.

In one embodiment, device 20 is employed with a telephone for cancelling the effect of the sidetone signal in the telephone to produce an output signal which is indicative of the maintone signal of the telephone. FIG. 2 shows a block diagram of the major components of device 20 as employed with a local telephone 61. The major components of device 20 are shown as enclosed within a dashed line. Also shown in FIG. 2 are devices which operate on signals that feed into device 20 and devices which are responsive to output signals from device 20. FIG. 2 is a particular embodiment of the general block diagram of FIG. 1.

Device 20, as shown in FIG. 2, is responsive to input signals generated externally from a first acoustic signal S23 and a second acoustic signal S25 to produce a conditioned primary output electronic signal S802 which is indicative of second acoustic signal S25 substantially independent of first acoustic signal S23.

First acoustic signal S23 is typically the voice of a local speaker/listener. An external acoustic-to-electronic transducer 31 receives first acoustic signal S23 and produces a first input signal S33 which is electronic in nature and representative of first acoustic signal S23. ("A-E" and "E-A" are used as abbreviations for "acoustic-to-electronic" and "electronic-to-acoustic" in the drawings.) Acoustic-to-electronic transducer 31 may, for example, include a microphone into which the local speaker/listener speaks and a signal amplifier for amplifying the audio output of the microphone. First input signal S33 then feeds into the first channel of device 20. Where external acoustic-to-electronic transducer 31 includes a microphone and associated signal amplifier, first input signal S33 is transmitted over a wire to device 20.

There is a direct correspondence between the input to the first channel for FIG. 2 and the input to the first channel as described for FIG. 1. First acoustic signal S23 corresponds to first signal S22, external acoustic-to-electronic transducer 31 corresponds to first signal modifier 30, and first input (electronic) signal S33 corresponds to first input signal S32.

First means 100 receives first input signal S33 and transforms it (1) into first intermediate signal S102 as described earlier for FIG. 1 and into (2) an internal electronic signal S104. Internal signal S104 is representative of first input signal S33. Internal transformation means 600 receives internal signal S104 and transforms it into a secondary output signal S602 which is representative of internal signal S104. Secondary output signal S602 is a third acoustic signal.

Third acoustic signal S602 is carried to the transmitter 64 of local telephone 61. The principal components of local telephone 61, which include transmitter 64, signal combiner 68, and receiver 72, are shown by dashed lines. Transmitter 64 converts third acoustic signal S602 into a telephone sidetone signal S66 which is representative of third acoustic signal S602.

There is a direct correspondence between the transmission of external signal S34 to signal combining device 60 as illustrated in FIG. 1 and the transmission of third acoustic signal S602 to local telephone 61 as described for FIG. 2. The combination of external acoustic-to-electronic transducer 31, first means 100, and internal transformation means 600 of FIG. 2 corresponds to first signal modifier 30 of FIG. 1. Third acoustic signal S602 corresponds to external signal S34. Local telephone 61 in FIG. 2 corresponds to signal combining device 60 of FIG. 1. First means 100 thus serves a dual function in the embodiment illustrated by FIG. 2. In addition to producing first intermediate signal S102, first means 100 is also part of the electronic and acoustic mechanisms for converting first acoustic signal S23 into sidetone signal S66.

Second acoustic signal S25 is typically the voice of a remote speaker/listener. The voice of the remote speaker/listener is converted into an electronic equivalent and transmitted to local telephone 61. The electronic equivalent of second acoustic signal S25 may be transmitted to local telephone 61 in a number of ways.

For example, FIG. 2 illustrates a remote telephone 41 which is employed by the remote speaker/listener. The principal components of remote telephone 41, which include transmitter 44, signal combiner 50, and receiver 54, are shown by dashed lines. The remote speaker/listener speaks into transmitter 44 of remote telephone 41. Transmitter 44 receives second acoustic signal S25 and converts it into a telephone maintone signal S43 which is representative of second acoustic signal S25. Maintone signal S43 is then carried over a telephone line 46 to local telephone 61.

Maintone and sidetone signals S43 and S66 are additively combined by the signal combiner 68 in local telephone 61 to produce a composite electronic telephone signal S70 that is representative of an additive combination of maintone and sidetone signals S43 and S66. Signal combiner 68 comprises hybrid-coil and balancing networks of the type previously mentioned. In the combination process, sidetone signal S66 is attenuated relative to maintone signal S43. Nevertheless, composite signal S70 is representative of an additive combination of maintone and sidetone signals S43 and S66.

Receiver 72 of local telephone 61 receives composite signal S70 and converts it into a second input signal S63 which is representative of composite signal S70. Second input signal S63 is a fourth acoustic signal. Since (1)

fourth acoustic signal S63 is representative of composite signal S70, (2) composite signal S70 is representative of an additive combination of maintone and sidetone signals S43 and S66, (3) maintone signal S43 is representative of second acoustic signal S25, and (4) sidetone signal S66 is representative of first acoustic signal S23, fourth acoustic signal S63 is thereby representative of an additive combination of first and second acoustic signals S23 and S25. Fourth acoustic (second input) signal S63 then feeds into the second channel of device 20.

There is a direct correspondence between second signal modifier 40 in combination with signal combining device 60 of FIG. 1 and remote telephone 41 in conjunction with local telephone 61 of FIG. 2. Second acoustic signal S25 corresponds to second signal S24. Transmitter 44 of remote telephone 41 in FIG. 2 corresponds to second signal modifier 40 of FIG. 1. Maintone signal S43 corresponds to external signal S42. Local telephone 61 of FIG. 2 corresponds to signal combining device 60 of FIG. 1. Fourth acoustic signal S63 corresponds to second input signal S62.

FIG. 2 also illustrates an example of how the voice of the local speaker/listener may be conveyed to the remote speaker/listener. In the example in FIG. 2, transmitter 64 of local telephone 61 produces a remote telephone maintone signal S74 which is representative of third acoustic signal S602 and thus representative of first acoustic signal S23. In fact, transmitter 64 actually produces one signal which is subsequently divided into sidetone signal S66 and remote maintone signal S74. Remote maintone signal S74 is carried over telephone line 46 to remote telephone 41. Transmitter 44 of remote telephone 41 produces a remote telephone sidetone signal S48. As with transmitter 64 of local telephone 61, transmitter 44 of remote telephone 41 actually produces one signal that is subsequently divided into remote sidetone signal S48 and maintone signal S43. Remote maintone signal S74 and remote sidetone signal S48 are additively combined by a signal combiner 50 to produce a composite electronic telephone signal S52 which is representative of a combination of remote sidetone and maintone signals S48 and S74. Receiver 54 of remote telephone 41 then converts composite signal S52 into an acoustic signal S56 which is representative of composite signal S52 and consequently representative of a combination of first and second acoustic signals S23 and S25. Note that transmission paths for signals S74, S48, S52 and S57 are shown by dashed lines.

Device 20 as illustrated in FIG. 2 comprises two channels having major components that operate in the same manner as described earlier for FIG. 1. In the first channel, first means 100 receives first input (electronic) signal S33 and transforms it into first intermediate signal S102 which is representative of first input signal S33. First intermediate signal S102 feeds into first envelope detector circuitry 300 to produce third intermediate signal S302 which feeds into subtracting means 500. In the second channel, second means 200 receives second input (fourth acoustic) signal S63 and transforms it into second intermediate signal S202 which is representative of second input (fourth acoustic) signal S63. Second intermediate signal S202 feeds into second envelope detector circuitry 400 to produce fourth intermediate signal S402 which feeds into subtracting means 500. Subtracting means 500 electronically subtracts third intermediate signal S302 from fourth intermediate signal S402 to produce primary output electronic signal S502 which is indicative of second acoustic signal S25 substantially independent of first acoustic signal S23.

In the embodiment depicted in FIG. 2, device 20 has gain control circuitry 700 connected in common between first means 100 and second means 200 for controlling the amplification gains of amplifiers contained in the circuitries of first and second means 100 and 200. Gain control circuitry 700 produces (1) a first gain control signal S702 which feeds into first means 100 and (2) a second gain control signal S704 which feeds into second means 200.

Device 20 further includes output conditioning means 800 which receives primary output signal S502 and further conditions it to produce conditioned primary output signal S802 which is indicative of primary output signal S502. Conditioned primary output signal S802, which is now in a form suitable for output usage, is thus indicative of second acoustic signal S25.

Conditioned primary output signal S802 leaves device 20 and feeds into an external output device 80. Output device 80 may, for example, be an electronic game that undergoes specified action in response to conditioned primary output signal S802 and thus in response to second acoustic signal S25 from the remote speaker/listener.

Optionally, device 20 may include circuitry for producing one or more secondary output signals that are each representative of an additive combination of first and second acoustic signals S23 and S25. In the embodiment illustrated in FIG. 2, second means 200 is further operable for transforming second input signal S63 into an internal electronic signal S204 which is representative of second input signal S63. Audio amplifier circuitry 900 receives internal signal S204 and generates two secondary output signals S902 and S904 which are electronic in nature and are each representative of internal signal S204. Since (1) secondary output signals S902 and S904 are each representative of internal signal S204, (2) internal signal S204 is representative of second input signal S63, and (3) second input signal S63 is representative of a combination of first and second acoustic signals S23 and S25, secondary output signals S902 and S904 are thus each representative of a combination of first and second acoustic signals S23 and S25.

Auxiliary broadcasting equipment 90 receives secondary output signal S902 and transmits it to selected places. An external electronic-to-acoustic transducer 92 receives secondary output signal S904 and generates an acoustic signal S94 which is representative of secondary output signal S902 and thus representative of a combination of first and second acoustic signals S23 and S25. External electronic-to-acoustic transducer 92 may, for example, be an earphone set and associated signal conditioning circuitry for use by the local speaker/listener or another person in the vicinity of the local speaker/listener in listening to acoustic signal S94.

FIGS. 3-4, 5A, 5B, and 6-11 illustrate circuitries for the major components of a preferred embodiment of device 20 in accordance with the embodiment of FIG. 2. Several of these figures are also block diagrams in part. FIG. 12 depicts the power supply 1000 that is employed with the preferred embodiment of FIG. 2.

The electronic circuitries for the major components of a preferred embodiment of device 20 and for power supply 1000 will generally be described functionally herein. To ascertain the precise electronic connections between the individual elements of the various circuitries, the reader may refer to FIGS. 3-4, 5A, 5B, and 6–12 which depict the precise element-by-element connections.

Conventional electronic symbols are employed in FIGS. 3–4, 5A, 5B, and 6–12 for showing the element-by-element connections of the major components and of power supply 1000. In addition, the following alphabetic notational system is used with the various reference numbers to simplify further identification of the various elements:

Before a reference number:
A = amplifier
C = capacitor
D = diode
P = variable resistor (potentiometer)
Q = transistor
R = resistor
T = transformer After a reference number:
G = gain control terminal
I = inverting terminal
N = non-inverting terminal
O = output terminal
U = upper line
L = lower line
U/L = upper and lower lines As previously stated, "S" before a reference number is defined as "signal". A specific signal is carried on a line having the same reference number, except for the letter "S", as the signal. For example, line 102 carries signal S102. The direct current (hereafter D.C.) source voltages from power supply 1000 are denoted as "$V_{CC}$" and "$V_B$".

As shown in FIG. 3, first means 100 receives (1) first input (electronic) signal S33 on lines 33U/L from external acoustic-to-electronic transducer 31 and (2) first gain control signal S702 on line 702 from gain control circuitry 700. Responsive to these signals, first means 100 produces (1) first intermediate signal S102 on line 102 which goes to first envelope detector circuitry 300 and (2) internal signal S104 on line 104 which goes to internal transformation means 600. First means 100 comprises signal conditioning circuitry 110 which in turn comprises attenuator circuitry 120, limiting amplifier circuitry 130, variable amplifier circuitry 150, and current amplifier circuitry 160.

Attenuator circuitry 120 receives first input signal S33 and produces an attenuated signal on lines 121U/L. Typically, the input impedance seen on lines 33U/L from external acoustic-to-electronic transducer 31 is 600 ohms, and first input signal S33 is at an amplitude level of 0 DBM. Resistors R123 and R125 to ground provide a termination for the output impedance of acoustic-to-electronic transducer 31. First input signal S33 comprises a first input D.C. component and a first input alternating current (hereafter A.C.) component. Blocking capacitors C122 and C124 substantially eliminate the first input D.C. component to provide D.C. isolation.

Responsive to the signal on lines 121U/L, limiting amplifier circuitry 130 produces (1) one amplified signal on line 131 and (2) another amplified signal on line 104—i.e., internal signal S104. Amplification is provided by operational amplifier A132 which is connected in an amplitude-limiting negative-feedback configuration so as to limit the maximum amplitudes of the amplified signals on lines 131 and 104 to a specified value. The resistances of resistors R133 and R135 are equal. These two resistors in conjunction with resistor R137 set the gain of limiting amplifier circuitry 130. In a preferred embodiment, this gain is approximately 0.5. Resistor R134 provides a D.C. bias from source voltage $V_{CC}$ to non-inverting terminal 132N of amplifier A132.

The feedback loop between inverting terminal 132I and output terminal 132O of amplifier A132 includes capacitors C136 and C140, resistors R137 and R141, and diodes D138 and D139. As the frequency increases, capacitor C136 provides increasingly greater negative feedback, thus acting progressively to cut off high-frequency amplification. In a preferred embodiment, the cut-off frequency is about 2000 hertz. The amplitude-limiting portion of the feedback loop comprises diodes D138 and D139, capacitor C140, and resistor R141. Capacitor C140 acts to provide D.C. blockage within the amplitude-limiting portion. Diodes D138 and D139 are arranged in a back-to-back configuration to provide the amplitude-limiting action. Resistor R141 is in series with diodes D138 and D139 to soften the effect of the amplitude-limiting action so that there is a gradual transition to the maximum amplitudes of the amplified signals on lines 131 and 104.

Responsive to the signal on line 131 and to first gain control signal S702, variable amplifier circuitry 150 generates a variably amplified signal on line 151. Amplification is provided by operational amplifier A152. The variable gain of amplifier A152 is controlled by the D.C. voltage on line 702 which feeds into the gain control input terminal 152G of amplifier A152. In a preferred embodiment, the active level for first gain control signal S702 is about 2 volts. Amplifier A152 is responsive to only a limited voltage swing in the signal input. In a preferred embodiment, the swing is limited to about 100 millivolts peak-to-peak. The signal incoming on line 131 often exceeds the limited peak-to-peak swing to which amplifier A152 can respond. Fixed resistor R153 and variable resistor P154 appropriately attenuate the signal incoming on line 131 to reduce the voltage swing to a level which is compatible with amplifier A152. Capacitor C155 serves to couple the attenuated signal into amplifier A152. Resistors R156 and R157 provide D.C. biases from source voltage $V_{CC}$ to inverting and non-inverting terminals 152I and 152N of amplifier A152.

Responsive to the signal on line 151, current amplifier circuitry 160 generates a current-amplified signal on line 102—i.e., first intermediate signal S102. Current application is provided by NPN transistor Q161 which is operated in an emitter-follower configuration. Resistor R162 to ground provides a load for transistor Q161 and establishes a specified output impedance for current amplifier circuitry 160. In a preferred embodiment, this output impedance is about 1 kiloohm.

Internal transformation means 600, as illustrated in FIG. 4, receives internal signal S104 and generates third acoustic (secondary output) signal S602 which goes to transmitter 64 of local telephone 61. Internal transformation means 600 comprises signal conditioning circuitry 610, electronic-to-acoustic transducer 660, and acoustic coupler 668. Signal conditioning circuitry 610 receives internal signal S104 and produces on lines 612U/L an internal electronic signal which is representative of internal signal S104. Electronic-to-acoustic transducer 660 receives the internal signal on lines 612U/L and converts it into third acoustic signal S602 which is representative of the internal signal on lines 612U/L. Acoustic coupler 668, which is connected to electronic-to-acoustic transducer 660 and is connectible to transmitter 64 of local telephone 61, carries third acoustic signal S602 from electronic-to-acoustic transducer 660 to transmitter 64.

Signal conditioning circuitry 610 comprises attenuator circuitry 620 and amplifier circuitry 640.

Attenuator circuitry 620 receives internal signal S104 and produces an attenuated signal on line 622. Internal signal S104 comprises an internal A.C. component and an internal D.C. component. Blocking capacitor C626 substantially eliminates the internal D.C. component to provide D.C. isolation. Resistors R624 and R628 in combination with resistors R630 and R632 to ground provide attenuation to reduce the maximum amplitude of the signal on line 622 to a specified value. In a preferred embodiment, the attenuation is such that the voltage swing on line 622 is approximately 0.2 volts peak-to-peak.

Responsive to the signal on line 622, amplifier circuitry 640 generates on lines 612U/L the internal signal which is an amplified signal. Signal amplification is provided by NPN transistor Q642 which is transformer-coupled to lines 612U/L. Resistor R643 provides a high-impedance path to ground. Resistor R648 to ground and resistor R646 provide a D.C. bias from source voltage $V_{CC}$ to the base of transistor Q642. Capacitor C644 prevents the D.C. bias voltage from being disturbed by circuitry preceding capacitor C644 and thus to isolate the D.C. bias voltage for transistor Q642. Resistor R650 serves to isolate the base of transistor Q642 from line 622. Emitter-coupled resistor R652 to ground controls the amplification gain of amplifier circuitry 640. Transformer T654, which is collector-coupled to transistor Q642, serves to match the output impedance of the circuitry preceding transformer T654 to the input impedance of electronic-to-acoustic transducer 660. In a preferred embodiment, this input impedance is 8 ohms.

Figure 5B:
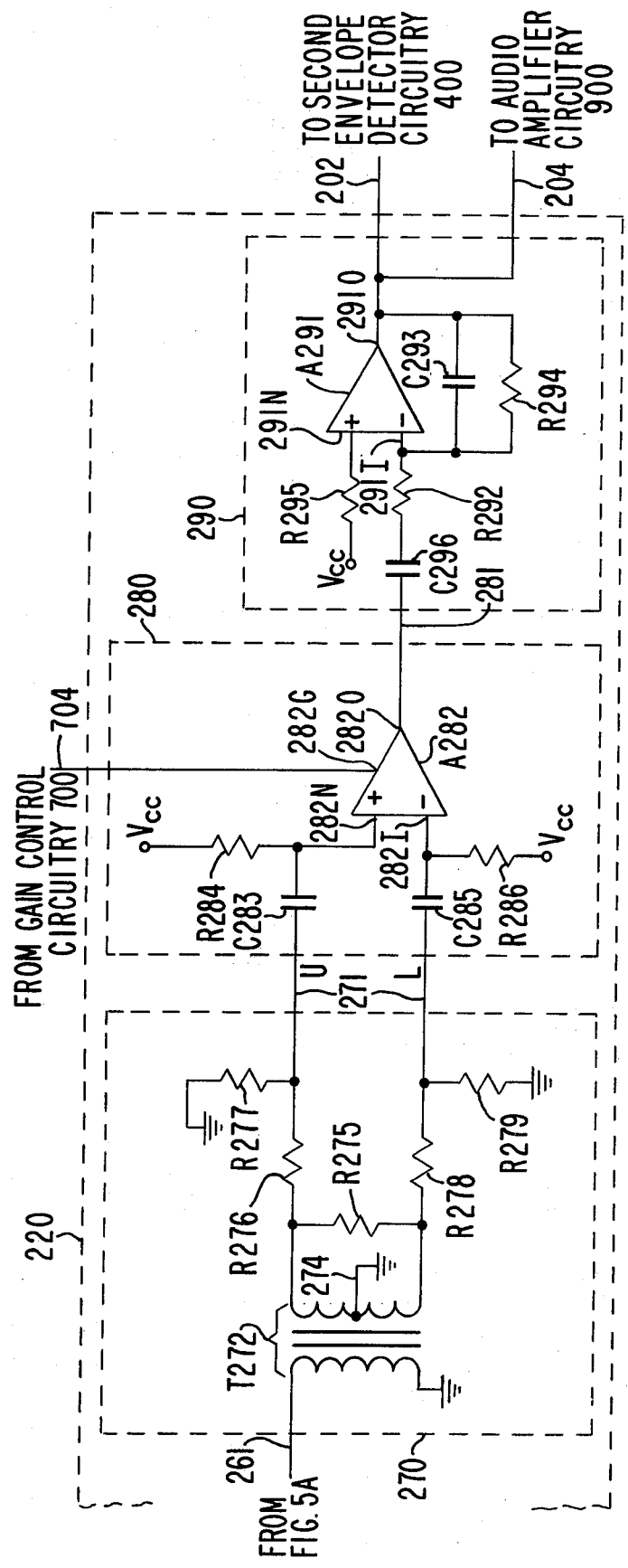

FIGS. 5A and 5B together illustrate a preferred embodiment of second means 200. As shown in FIGS. 5A and 5B, second means 200 receives (1) fourth acoustic (second input) signal S63 from receiver 72 of local telephone 61 and (2) second gain control signal S704 on line 704 from gain control circuitry 700. Responsive to these signals, second means 200 produces (1) second intermediate signal S202 on line 202 which goes to second envelope detector circuitry 400 and (2) internal signal S204 on line 204 which goes to audio amplifier circuitry 900. Second means 200 comprises acoustic coupler 208, acoustic-to-electronic transducer 210, and signal conditioning circuitry 220. Acoustic coupler 208, which is connected to acoustic-to-electronic transducer 210 and is connectible to receiver 72 of local telephone 61, carries fourth acoustic signal S63 from receiver 72 to acoustic-to-electronic transducer 210. Acoustic-to-electronic transducer 210 receives fourth acoustic signal S63 and converts it into an intermediate electronic signal representative of fourth acoustic signal S63. This intermediate signal is transmitted out from acoustic-to-electronic transducer 210 on lines 212U/L.

Signal conditioning circuitry 220 receives (1) the intermediate signal on lines 212U/L and (2) second gain control signal S704. Signal conditioning circuitry 220 produces (1) second intermediate signal S202 and (2) internal signal S204. Both second intermediate signal S202 and internal signal S204 are representative of the intermediate signal on lines 212U/L. Signal conditioning circuitry 220 comprises voltage amplifier circuitry 230, band-pass amplifier circuitry 240, band-pass amplifier circuitry 250, current amplifier circuitry 260, impedance matching circuitry 270, variable amplifier circuitry 280, and voltage amplifier circuitry 290.

Voltage amplifier circuitry 230 receives the intermediate signal on lines 212U/L and produces a voltage amplified signal on line 231. Voltage amplification is provided by operational amplifier A232 which is connected in a negative-feedback configuration. The intermediate signal on lines 212U/L comprises an intermediate D.C. component and an intermediate A.C. component. Blocking capacitor C233 substantially eliminates the intermediate D.C. component on line 212U/L. Resistor R234 provides a D.C. bias from source voltage $V_B$ to non-inverting terminal 232N of amplifier A232. Capacitor C237 to ground serves to remove high-frequency noise incoming on lines 212U/L. The feedback loop between inverting terminal 232I and output terminal 232O of amplifier A232 comprises resistor R235. Resistor R236 provides a D.C. bias from source voltage $V_B$ to inverting terminal 232I. The gain of voltage amplifier circuitry is determined by resistors R235 and R236.

Responsive to the signal on line 232, band-pass amplifier circuitry 240 produces an amplified signal on line 241. Signal amplification is provided by operational amplifier A242 which is connected in a negative-feedback band-pass configuration to serve as an active filter, so that amplification of the signal incoming on line 231 is substantially limited to a specified frequency range. The feedback loop between inverting terminal 242I and output terminal 242O of amplifier A242 includes resistor R246 and capacitors C244 and C245. The elements in the feedback loop in conjunction with input resistor R243 establish the precise filter characteristics of band-pass amplifier circuitry 240. Capacitor C244 also provides D.C. blockage of the signal incoming on line 231. Resistor R247 provides a D.C. bias from source voltage $V_B$ to noninverting terminal 242N of amplifier A242.

Responsive to the signal on line 241, band-pass amplifier circuitry 250 generates an amplified signal on line 251. The arrangement and operation of the elements in bandpass amplifier circuitry 250 is identical to the arrangement and operation of the elements in band-pass amplifier circuitry 240. Operational amplifier A252, resistor R253, capacitor C254, capacitor C255, resistor R256, and resistor R257 within band-pass amplifier circuitry 250 correspond to, and function identically to, operational amplifier A242, resistor R243, capacitor C244, capacitor C245, resistor R246 and resistor R247 of band-pass amplifier circuitry 240. The combination of band-pass amplifier circuitries 240 and 250, results in a flat filter response over a specified frequency range. For a preferred embodiment, this frequency range is approximately 500–2000 hertz.

Responsive to the signal on line 251, current amplifier circuitry 260 generates a current-amplified signal on line 261. Amplification is provided by NPN transistor Q262 which is connected in an emitter-follower configuration. Emitter-series resistor R263 and resistor R264 to ground provide some isolation and also establish a specified output impedance from current-amplifier circuitry 260. In a preferred embodiment, this output impedance is 600 ohms. Capacitor C265 provides additional D.C. blockage.

Responsive to the signal on line 261, impedance matching circuitry 270 provides an impedance-matched signal on lines 271U/L. Transformer T272 with center tap 274 to ground blocks common-mode voltages while coupling line 261 to lines 271U/L. Resistor R275 establishes a terminating impedance to the output impedance from current amplifier circuitry 260. This terminating impedance is 600 ohms in a preferred embodiment. Operational amplifier A282 within variable amplifier circuitry 280 is responsive to only a limited voltage swing in the signal input. In a preferred embodiment, the swing is limited to about 10 millivolts peak-to-peak. The resistor network comprising resistors R277 and R279 to ground and resistors R276 and R278 provide signal attenuation to reduce the voltage swing on lines 271U/L to a level compatible with amplifier A282.

Responsive to the signal on lines 271U/L and to second gain control signal S704, variable amplifier circuitry 280 produces a variably amplified signal on line 281. Amplification is provided by operational amplifier A282. The variable gain of amplifier A282 is controlled by the D.C. voltage on line 704 which feeds into the gain control input terminal 282G of amplifier A282. In a preferred embodiment, the active level for second gain control signal S704 is about 2 volts. Resistors R284 and R286 from voltage source $V_{CC}$ provide D.C. biases to non-inverting and inverting terminals 282N and 282I of amplifier A282. Blocking capacitors C283 and C285 isolate the D.C. bias voltages of amplifier A282 from the signal coming in on lines 271U/L. Capacitors C283 and C285 also act as a low-frequency cut-off for attenuating any 60-hertz hum that might exist on lines 271U/L.

Responsive to the signal on line 281, voltage amplifier circuitry 290 generates (1) one voltage-amplified signal on line 202—i.e., second intermediate signal S202—and (2) another voltage-amplified signal on line 204—i.e., internal signal S204. Voltage amplification is provided by operational amplifier A291 which is connected in a negative-feedback configuration. The feedback loop between inverting terminal 291I and output terminal 291O of amplifier A291 includes resistor R294 and capacitor C293. Resistor R294 and input resistor R292 establish the gain of voltage amplifier circuitry 290. Capacitor C293 cuts off high-frequency amplification. Typically, frequencies above 2000 hertz are progressively cut off. Resistor R295 provides a D.C. bias from source voltage $V_{CC}$ to non-inverting terminal 291N of amplifier A291. Capacitor C296 blocks the D.C. component of the signal entering on line 281 to provide D.C. isolation.

As shown in FIG. 6, first envelope detector circuitry 300 receives first intermediate signal S102 and produces third intermediate signal S302 on line 302 which goes to subtracting means 500. Third intermediate signal S302 is representative of the peak voltage amplitude envelope of first intermediate signal S102. First envelope detector circuitry 300 comprises band-pass amplifier circuitry 310 and envelope peak detector 350.

Band-pass amplifier circuitry 310 receives first intermediate signal S102 and produces an amplified signal on line 312. Upon entering band-pass amplifier circuitry 310, first intermediate signal S102 splits and follows two different paths. One path is to operational amplifier A314 which is connected in a negative-feedback band-pass configuration. Operational amplifier A314 as connected in this band-pass configuration acts as an active filter to amplify frequencies only in a specified frequency range. In a preferred embodiment, the frequency range is 900–1500 hertz. The feedback loop between inverting terminal 314I and output terminal 314O of amplifier A314 comprises capacitors C322 and C326 and resistor R324. In conjunction with amplifier A314, the elements of the active filter are resistor R318, resistor R320 to ground, and the three feedback elements C322, C326, and R324. These five elements together establish the amplification gain and precise band-pass characteristics for the active filter. Resistor R328 provides a D.C. bias from voltage source $V_{CC}$ to the non-inverting terminal 314N of amplifier A314.

Following amplifier A314 is a second operational amplifier A316. Inverting terminal 316I of amplifier A316 serves as a summing point where the separate paths followed by the two portions of first intermediate signal S102 come together. The portion of first intermediate signal S102 which passes through the active filter in band-pass amplifier circuitry 310 drives amplifier A316 through input resistor R334 to inverting terminal 316I. The other portion of first intermediate signal S102 follows a second path through capacitor C330 and resistor R332 to inverting terminal 316I. Capacitor C330 blocks any D.C. component of the signal portion following the second path. The two signal portions, as modified by the intervening elements, are summed, and amplifier A316 amplifies the resultant summed signal. The ratio of the resistance of resistor R334 to the resistance of resistor R332 largely determines the summing characteristics for amplifier A316. Resistor R340 provides a D.C. bias from voltage source $V_{CC}$ to non-inverting terminal 316N of amplifier A316. Amplifier A316 is connected in a negative-feedback configuration. The feedback loop between inverting terminal 316I and output terminal 316O of amplifier A316 includes capacitor C336 and resistor R338. Capacitor C336 provides a progressive high-frequency cut-off in amplification. Resistor R338 in conjunction with resistors R332 and R334 determine the amplification gain for amplifier A316.

First input signal S33 essentially follows two routes in being operated upon by sidetone cancelling device 20. One route is through first means 100 and then, in modified form as first intermediate signal S102, to band-pass amplifier circuitry 310 in envelope detector circuitry 300. The other route is through internal transformation means 600, through local telephone 61, through second means 200, and then in modified form as a component of second intermediate signal S202, to second envelope detector circuitry 400. By splitting first intermediate signal S102 into two portions which pass along two different paths and then recombining the portions, as modified, band-pass amplifier circuitry 300 models the characteristics of the hybrid-coil in signal combiner 68 of local telephone 61. The signal characteristics of the summed signal entering amplifier A316 then duplicate the signal characteristics of second intermediate signal S202 which result from passage along the route through the hybrid-coil in signal combiner 68. This duplication of signal characteristics reduces error in the signal cancelling operation.

Responsive to the signal on line 312, envelope peak detector 350 produces third intermediate signal S302. Third intermediate signal S302 is a signal corresponding to the envelope of the positive peak voltage amplitudes of the signal on line 312. Diode D352 and capacitor C358 function to detect the positive peak amplitudes of the signal on line 312. Diode D352, acting as a rectifier, passes only the positive voltage signal on line 312. Capacitor C358 is chosen to be small in relationship to the output impedance of band-pass amplifier circuitry 310 (and amplifier A316 in particular) at the frequencies of interest. As current passes through diode D352, capacitor C358 charges rapidly up to a voltage level corresponding to the positive peak amplitudes of the signal on line 312. The peak voltage amplitudes, which have been captured on capacitor C358, then pass through the averaging network comprising resistor R354, resistor R356, and capacitor C360 to ground. These three elements average the peak voltage amplitudes to produce a signal corresponding to the envelope of the peak positive amplitudes of the signal on line 312. Resistors R354 and R356 and capacitor C360 also act to delay the voltage amplitude envelope as it appears as third intermediate signal S302. In a preferred embodiment, the averaging network in envelope peak detector 350 has a delay time constant of about 18 milliseconds.

Second envelope detector circuitry 400, as illustrated in FIG. 7, receives second intermediate signal S202 and produces fourth intermediate signal S402 on line 402 which goes to subtracting means 500. Fourth intermediate signal S402 is representative of the peak voltage amplitude envelope of second intermediate signal S202. Second envelope detector circuitry 400 comprises band-pass amplifier circuitry 410 and envelope peak detector 450.

Band-pass amplifier circuitry 410 receives second intermediate signal S202 and generates an amplified signal on line 412. Amplification is provided by operational amplifier A414 which is connected in a negative-feedback band-pass configuration to function as an active filter. The feedback loop between inverting terminal 414I and output terminal 414O of amplifier A414 comprises capacitors C418 and C424 and resistor R422. In conjunction with amplifier A414, the elements of the active filter are resistor R416, resistor R420 to ground, and the three feedback elements C418, C424, and R422. These five elements together establish the amplification gain and precise band-pass characteristics for the active filter. Resistor R426 provides the D.C. bias from source voltage $V_{CC}$ to non-inverting terminal 414N of amplifier A414. Band-pass amplifier circuitry 410 functions to amplify only frequencies within a selected frequency range. In a preferred embodiment this frequency range is 900–1500 hertz.

The frequency range of 900–1500 hertz is the predominant range of frequencies for human speech. In a preferred embodiment, band-pass amplifier circuitry 410 serves to mask out some of the variations in second intermediate signal S202 arising from the hybrid-coil network in signal combining device 68 of local telephone 61 by selecting the predominant frequency range in human speech. Band-pass amplifier circuitry 310 provides corresponding signal duplication in the first channel by passing only frequencies in the same frequency range—i.e., 900–1500 hertz in a preferred embodiment.

Responsive to the signal on line 412, envelope peak detector 450 produces fourth intermediate signal S402. Fourth intermediate signal S402 is a signal corresponding to the positive peak voltage amplitude envelope of the signal on line 412. The circuitry of envelope peak detector 450 parallels that of envelope peak detector 350. Diode D452 and capacitor C458 to ground function to detect the peak positive amplitudes of the signal on line 412. As diode D452 passes current, capacitor C458 charges to a voltage level corresponding to the positive peak amplitudes of the signal on line 412. Capacitor C458 is chosen to be sufficiently small in relationship to the output impedance of band-pass amplifier circuitry 410 such that, at the frequencies of interest, capacitor C458 charges rapidly to the level of positive peak amplitudes. The peak voltages captured on capacitor C458 then pass through the averaging network comprising resistor R454, resistor R456, and capacitor C460 to ground. This averaging network averages the peak positive voltage amplitudes to produce a signal corresponding to the positive peak amplitude envelope of the signal on line 412. The averaging network also delays transmission of the amplitude envelope as it appears as fourth intermediate signal S402 on line 402. The delay time constant for the averaging network in envelope peak detector 450 may be selected to be somewhat greater than the delay time constant of the averaging network in envelope peak detector 350. In a preferred embodiment, the delay time constant for envelope peak detector 450 is 30 milliseconds. The difference in delay time constants in a preferred embodiment gives an advantage to third intermediate signal S302 over fourth intermediate signal S402 to account for some imperfections in the modeling.

Envelope detector circuitries 300 and 400 have been described as including band-pass amplifier circuitries 310 and 410, respectively. Alternatively, band-pass amplifier circuitries 310 and 410 could have been defined as parts of first and second means 100 and 200, respectively.

Figure 8:
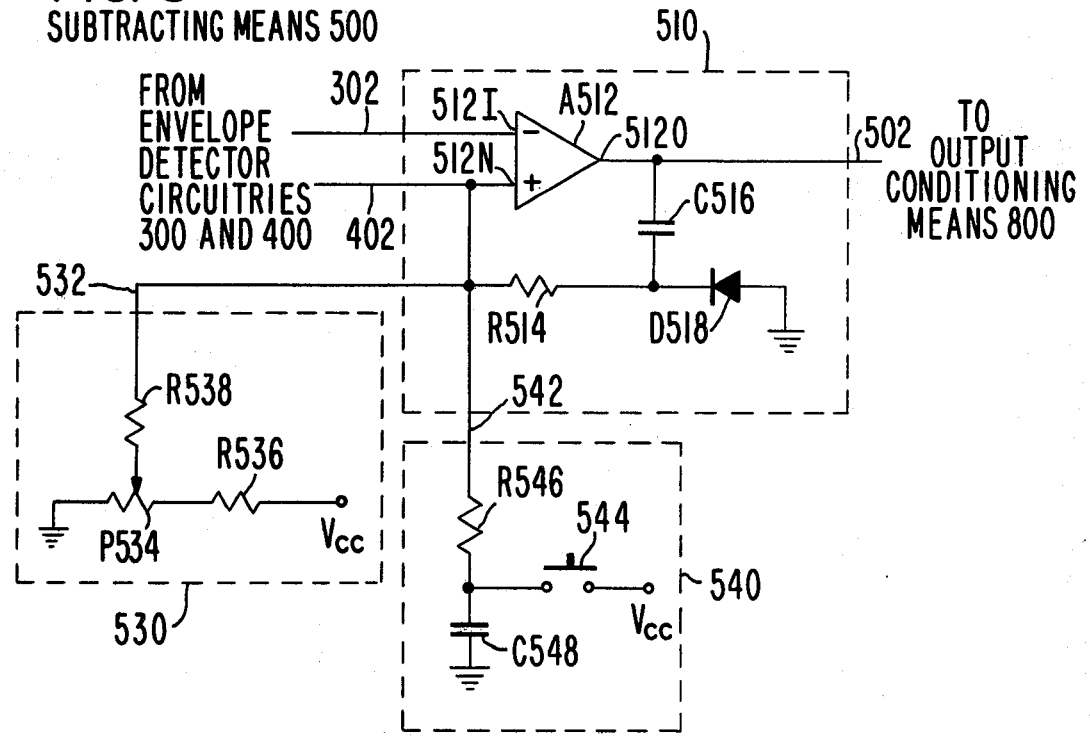
FIG. 8 is a circuit diagram of an embodiment of the subtracting means for use in the device of FIG. 2.

Subtracting means 500, as depicted in FIG. 8, receives (1) third intermediate signal S302 and (2) fourth intermediate signal S402 and produces primary output signal S502 on line 502 which goes to output conditioning means 800. Subtracting means 500 comprises differential comparator circuitry 510, threshold control circuitry 530, and test switch circuitry 540.

Differential comparator circuitry 510 receives third and fourth intermediate signals S302 and S402 and produces primary output signal S502. Differential comparator circuitry 510 also receives a threshold control signal on line 532 and, whenever test switch circuitry 540 is activated, receives a test signal on line 542.

The principal element of differential comparator circuitry 510 is operational amplifier A512 which compares the currents feeding into non-inverting and inverting terminal 512N and 512I. Amplifier A512 is operated in the saturation (binary) mode such that the signal at output terminal 512O is substantially equal either to (1) a low value (corresponding to the output of amplifier A512 being in the low state) when the current feeding into inverting terminal 512I exceeds the current feeding into non-inverting terminal 512N or (2) a high value (corresponding to the output of amplifier A512 being in the high state) when the current feeding into non-inverting terminal 512N exceeds the current feeding into inverting terminal 512I. In turn, primary output signal S502 is equal either to (1) a corresponding low value when output terminal 512O is at the low value or (2) a corresponding high value when output terminal 512I is at the high value.

Third and fourth intermediate signals S302 and S402 provide input currents to inverting and non-inverting terminals 512I and 512N, respectively. The threshold control signal on line 532 constitutes a (positive) bias current that feeds into non-inverting terminal 512N. The bias current and the current of fourth intermediate signal S402 are effectively summed at non-inverting terminal 512N. Amplifier A512 then compares the current of third intermediate signal S302 with the sum of the bias current and the current of fourth intermediate signal S402.

The negative of the bias current is conveniently defined as the threshold current. Then, when the current of fourth intermediate signal S402 minus the current of third intermediate signal S302 is less than the threshold current, the output of amplifier A512 is in the low state. If the current on line 402 increases such that the current of fourth intermediate signal S402 minus the current of third intermediate signal S302 is greater than the threshold current, the output of amplifier A512 switches to the high state.

Mathematically, a first positive quantity may be referred to as "exceeding" a second positive quantity by a reference quantity even though the second positive quantity has a greater value than the first positive quantity if the reference quantity has an appropriate negative value such that the sum of the first positive quantity and the absolute value of the reference quantity is greater than the second positive quantity. Upon employing this mathematical definition and letting the threshold current (which is equal to the negative of the bias current in the embodiment described herein) correspond to a threshold level value, differential comparator circuitry 510 operates such that primary output signal S502 is substantially equal (1) to a first specified value when fourth intermediate signal S402 exceeds third intermediate signal S302 by the threshold level value and (2) to a second specified value when fourth intermediate signal S402 does not exceed third intermediate signal S302 by the threshold level value.

Although differential comparator circuitry 510 above has been described with reference to a bias current that is summed with fourth intermediate signal S402, other biasing systems may be utilized in the invention. For example, a bias current could be summed with third intermediate signal S302. In this example, the bias current would equal the threshold current directly, and the final result would be the same as indicated above—i.e., that primary output signal S502 assumes a first specified value or a second specified value depending on whether fourth intermediate signal S402 exceeds third intermediate signal S302 by a threshold level value or not.

The idle state exists when first and second acoustic signals S23 and S25 are at zero values, and therefore first and second input signals S33 and S63 are at zero values. In the idle state, the current of third intermediate signal S302 equals a first idle-state value (established largely by resistors R354 and R356 in envelope peak detector 350 and by the idle-state output voltage of band-pass amplifier circuitry 310 on line 312). Similarly, in the idle state, the current of fourth intermediate signal S402 equals a second idle-state value (determined largely through resistors R454 and R456 in envelope peak detector 450 and by the idle-state output voltage of band-pass amplifier circuitry 410 on line 412). The second idle-state value is sufficiently lower than the first idle-state value that the first idle-state value exceeds the sum of the second idle-state value and the bias current. The output of amplifier A512 is then in the low state during the idle state. The difference between the first idle-state value and the sum of the bias current and the second idle-state value is defined as the differential threshold current value. The current of fourth intermediate signal S402 must increase by an amount relative to the current of third intermediate signal S302 that exceeds the differential threshold current value to cause the output of amplifier S512 to switch to the high state.

Consider what happens when first acoustic signal S23 is at a non-zero value—i.e., the local speaker/listener is speaking and his/her voice is being transmitted to transmitter 64 of local telephone 61—while second acoustic signal S25 remains at a zero value—i.e., the remote speaker/listener is silent. Since first input signal S33 which is representative of first acoustic signal S23 feeds into the first channel of sidetone cancelling device 20, third intermediate signal S302 increases over the first idle-state value. With no maintone signal S43, second input signal S63 which feeds into the second channel is representative solely of first acoustic signal S23. Consequently, fourth intermediate signal S402 also increases over the second idle-state value. The two increases in current are generally proportional to the respective idle-state currents, so that the increase in current for third intermediate signal S302 exceeds the increase in current for fourth intermediate signal S402. The two increases in current partially nullify each other when they are compared in amplifier A512, with the generally greater increase of third intermediate signal S302 causing the current of third intermediate signal S302 to exceed further the sum of the bias current and the current of fourth intermediate signal S402. Thus, the output of amplifier A512 remains in the low state.

As second acoustic signal S25 increases over a non-zero value—i.e., the remote speaker/listener is also speaking—only second input signal S63 further increases. First input signal S33 does not increase further. Accordingly, the current of fourth intermediate signal S402 increases relative to the current of third intermediate signal S302. When second acoustic signal S25 reaches a sufficiently high amplitude to cause the current of fourth intermediate signal S402 relative to the current of third intermediate signal S302 to increase by an amount exceeding the differential threshold current value, the output of amplifier A512 goes to the high state. The differential threshold current value which is determined by the threshold control signal on line 532 thus corresponds to a threshold sound value (e.g., in decibels) that second acoustic signal S25 must exceed for the signal at output terminal 512O to go to the high value.

Amplifier A512 is connected in a positive-feedback configuration. The positive-feedback loop between non-inverting terminal 512N and output terminal 512O includes the series string of capacitor C516 and resistor R514. The positive-feedback loop provides a one-shot action such that if the current of fourth intermediate signal S402 exceeds the current of third intermediate signal S302 by the threshold current for only a very short transition time, the output of amplifier A512 remains in the high state for a specified time period. In a preferred embodiment, this time period is approximately 25 milliseconds. Diode D518 serves to discharge feedback capacitor C516 after the output of amplifier A512 returns to the low state from the high state. Discharging capacitor C516 through diode D518 insures that amplifier A512 is promptly ready to switch back to the high state as necessary.

Threshold control circuitry 530 produces the threshold control signal on line 532. The combination of fixed resistor R536 and variable resistor P534 between ground and source voltage $V_{CC}$ provides a variable voltage over a specified range. In a preferred embodiment, this range is 0–6 volts. This variable voltage then feeds through resistor R538 and is converted into the bias current which is varied by adjusting variable resistor P534.

Test switch circuitry 540 produces the test signal on line 542 for the purpose of testing differential comparator circuitry 510. The test signal is produced by actuating push-button switch 544. Closing push-button switch 544 places a specified voltage across resistor R546. In a preferred embodiment, the specified voltage is 12 volts. If third and fourth intermediate signals S302 and S402 are at their idle-state values, the current on line 542 resulting from closing push-button switch 544 exceeds the differential threshold current value. The current on line 542 is summed with the bias current and the current of fourth intermediate signal S402. As a consequence, the current feeding into non-inverting terminal 512N exceeds the current feeding into inverting terminal 512I to cause the output of amplifier A512 to change to the high state. Capacitor C548 to ground acts to eliminate noise in the test signal.

Figure 9:
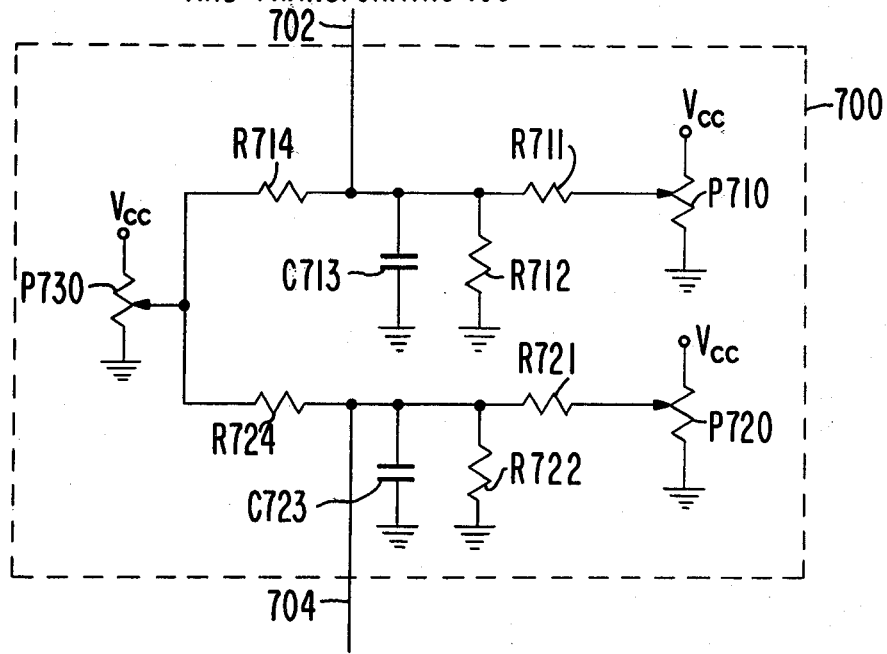
FIG. 9 is a circuit diagram of an embodiment of the gain control circuitry for use in the device of FIG. 2.

As illustrated in FIG. 9, gain control circuitry 700 produces (1) first gain control signal S702 which goes to first means 100 and (2) second gain control signal S704 which goes to second means 200. Gain control circuitry 700 comprises two parallel networks of fixed resistors, variable resistors, and capacitors. One of the parallel networks generates first gain control signal S702, and the other parallel network generates second gain control signal S704. The network for first gain control signal S702 comprises capacitor C713, variable resistor P710, and fixed resistors R711 and R712. Resistor R711, resistor R712 to ground, and variable resistor P710 between ground and source voltage $V_{CC}$ act to place first gain control signal S702 at the desired active level. In a preferred embodiment, the active level is about 2 volts. The active level is varied by adjusting variable resistor P710. Variable resistor P710 is smaller than the sum of (the resistances of) resistors R711 and R712, and resistor R711 is large compared to resistor R712, so that adjusting variable resistor P710 does not affect the voltage change available from adjusting variable resistor P730 (discussed below). Capacitor C713 to ground serves to eliminate only A.C. variations.

The networks for second gain control signal S704 comprises capacitor C723, variable resistor P720, and resistors R721 and R722. The network for second gain control signal S704 operates in the same manner as the network for first gain control signal S702 with capacitor C723, variable resistor P720, and resistors R721 and R722 corresponding to, and performing the same functions as, capacitor C713, variable resistor P710, and resistors R711 and R712, respectively. As with first gain control signal S702, in a preferred embodiment, the active level for second gain control signal S704 is about 2 volts.

In common with the two gain control networks is variable resistor P730 from source voltage $V_{CC}$ to ground. When the network for first gain control signal S702 has been set near the active level, variable resistor P730 in conjunction with fixed resistor R714 can be employed to make finer changes in the voltage of first gain control signal S702. In a preferred embodiment, variable resistor P730 and fixed resistor R714 can be used to adjust the voltage on line 702 by up to 0.5 volts; a 0.5 volt adjustment changes the gain of variable amplifier circuitry 150 by a factor of approximately 100. Similarly, once second gain control signal S704 has been set near the active level by its network, variable resistor P730 in conjunction with fixed resistor R724 can be utilized to make finer adjustments in the voltage of second gain control signal S704. In a preferred embodiment, the voltage on line 704 can also be adjusted by up to 0.5 volts; a 0.5 volt adjustment changes the gain of variable amplifier circuitry 280 by a factor of approximately 100. Adjustment of variable resistor P730 affects first and second gain control signals S702 and S704 at the same time and in the same manner. Thus, the voltages on lines 702 and 704 can be finely adjusted simultaneously by using variable resistor P730 even though they may have been adjusted to different starting points.

Figure 10:
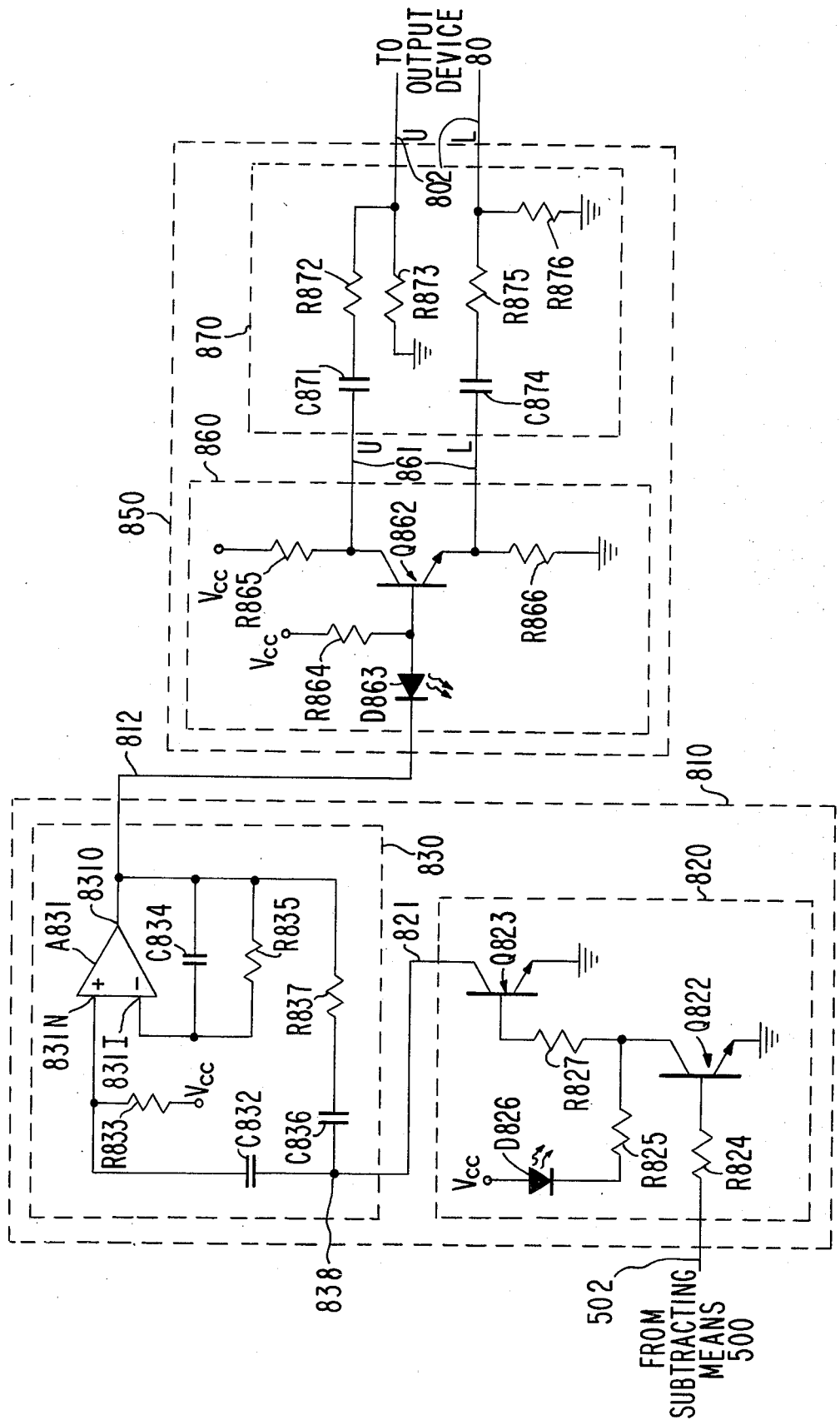
FIG. 10 is a circuit diagram of an embodiment of the output conditioning means for use in the device of FIG. 2.

As shown in FIG. 10, output conditioning means 800 receives primary output signal S502 and produces conditioned primary output signal S802 on lines 802U/L which go to output device 80. Conditioned primary output signal S802 is indicative of primary output signal S502. Output conditioning means 800 comprises keyed oscillating circuitry 810 and impedance matching circuitry 850.

Keyed oscillating circuitry 810 receives signal S502 and generates a controlled-tone signal on line 812. A controlled-tone signal is a sine-wave signal of constant maximum amplitude. Keyed oscillating circuitry 810 comprises oscillator keying circuitry 820 and Wien bridge keyed oscillator 830.

Oscillator keying circuitry 820 receives primary output signal S502 and produces a keying signal on line 821 to operate Wein bridge keyed oscillator 830. Oscillator keying circuitry 820 employs two inverting NPN transistors Q822 and Q823 for generating the keying signal. Connected in an emitter-grounded arrangement, transistor Q822 is driven through its base and through input resistor R824 by primary output signal S502. The collector load for transistor Q822 includes resistor R825 and light-emitting diode (hereafter LED) D826 from source voltage $V_{CC}$. LED D826 is employed for indicating to the operator of sidetone cancelling device 20 when primary output signal S502 changes state. The collector of transistor Q822 in turn drives transistor Q823, which is connected in an emitter-grounded arrangement, through base resistor R827.

Transistors Q822 and Q823 are operated in the binary on/off (i.e., conducting/non-conducting) mode. When primary output signal S502 is in the low state, transistor Q822 is turned off which causes transistor Q823 to turn on. This creates a low output impedance through transistor Q823 to ground on line 821. Conversely, when primary output signal S502 goes to the high state, transistor Q822 turns on causing transistor Q823 to turn off. When transistor Q823 is turned off, a high impedance to ground is produced on line 821.

Responsive to the keying signal on line 821, Wien bridge keyed oscillator 830 produces on line 812 the controlled-tone signal at a selected frequency. The tone-producing element is operational amplifier A831 which is connected in two feedback paths. One of the feedback paths is a positive-feedback loop connected between output terminal 831O and non-inverting terminal 831N of amplifier A831 and comprising the series combination of resistor R837 and capacitors C832 and C836. The keying signal on line 821 enters the positive-feedback loop at input mode 838 between capacitor C832 and C836. In the positive-feedback loop, capacitor C836 is the principal frequency-determining element. Capacitor C832 serves to isolate input node 838 from non-inverting terminal 831N and is chosen to be large with respect to capacitor C836 so that capacitor C832 has little effect on the oscillation frequency. Resistor R833 provides a D.C. bias from source voltage $V_{CC}$ to non-inverting terminal 831N. The other feedback path is a negative-feedback loop between output terminal 831O and inverting terminal 831I of amplifier A831 comprising the parallel combination of capacitor C834 and resistor R835. Amplifier A831 oscillates at the frequency where the phase shift of the negative-feedback loop is equal and opposite to the phase shift of the positive-feedback loop. In a preferred embodiment, the oscillation frequency is 500 hertz.

When the output impedance to ground from oscillator keying circuitry 820 seen on line 821 is low, which occurs when transistor Q823 is turned on, node 838 is effectively grounded. Grounding node 838 substantially eliminates the positive-feedback in Wien bridge keyed oscillator 830 and prevents oscillation. Conversely, when transistor Q823 is turned off so that the output impedance to gound seen on line 821 is high, node 838 is not grounded. With node 838 not grounded, positive feedback is allowed, and Wien bridge keyed oscillator 830 sends out the controlled-tone signal on line 812. Thus, when primary output signal S502 is in the low state, oscillator keying circuitry 820 produces essentially a zero-A.C.-output signal on line 812. When primary output signal S502 is in the high state, oscillator keying circuitry 820 turned Wien bridge keyed oscillator 830 on to send out the controlled-tone signal at the selected oscillation frequency.

Responsive to the signal on line 812, impedance matching circuitry 850 generates conditioned primary output signal 802. Impedance matching circuitry 850 comprises power amplifier circuitry 860 and output balancing circuitry 870.

Responsive to the signal on line 812, power amplifier circuitry 860 produces a power-amplified signal on lines 861U/L. Power amplification is provided by NPN transistor Q862, which is essentially operated in a common-emitter configuration for line 861U and in an emitter-follower configuration for line 861L. Resistor R864 from source voltage $V_{CC}$ provides a selected voltage to the base of transistor Q862. LED D863 functions to keep the base of transistor Q862 at a higher voltage than the voltage incoming on line 812. LED D863 does not serve as an indicator. In a preferred embodiment, the voltage difference is 1.6 volts. This voltage differential insures that transistor Q862 is always conducting to prevent distortion of the controlled-tone sine-wave signal entering on line 812. The resistance of resistor R865 from source voltage $V_{CC}$ and the resistance of resistor R866 to ground are equal so that lines 861U/L have equal and opposite voltage swings in transmitting the power-amplified signal.

Responsive to the signal on lines 861U/L, output balancing circuitry 870 produces conditioned primary output signal S802. Output balancing circuitry 870 contains two symmetrical networks. One network is for line 861U and comprises blocking capacitor C871, series resistor R872, and resistor R873 to ground. The other network is for line 861L and comprises blocking capacitor C874, series resistor R875, and resistor R876 to ground. Blocking capacitors C871 and C874 provide D.C. isolation to eliminate substantially any D.C. component existing in the signal incoming on lines 861U/L. Resistors R872 and R875 provide isolation and attenuation of the A.C. component of the signal on lines 861U/L. Resistors R873 and R876 provide further A.C. attenuation and also function to provide a selected output impedance for sidetone cancelling device 20. In a preferred embodiment, the selected output impedance is 600 ohms.

Figure 11:
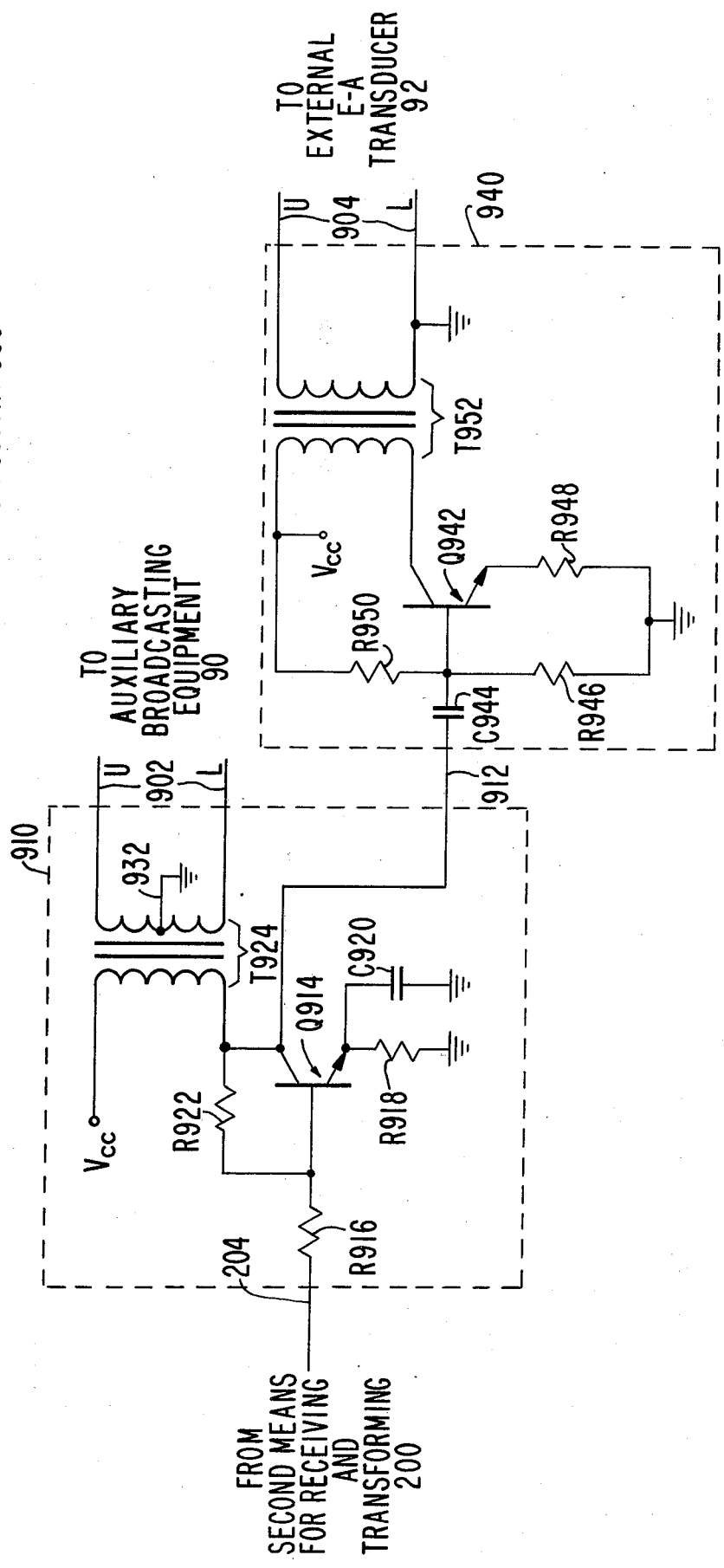
FIG. 11 is a circuit diagram of an embodiment of the audio amplifier circuitry for use in the device of FIG. 2.
Figure 12:
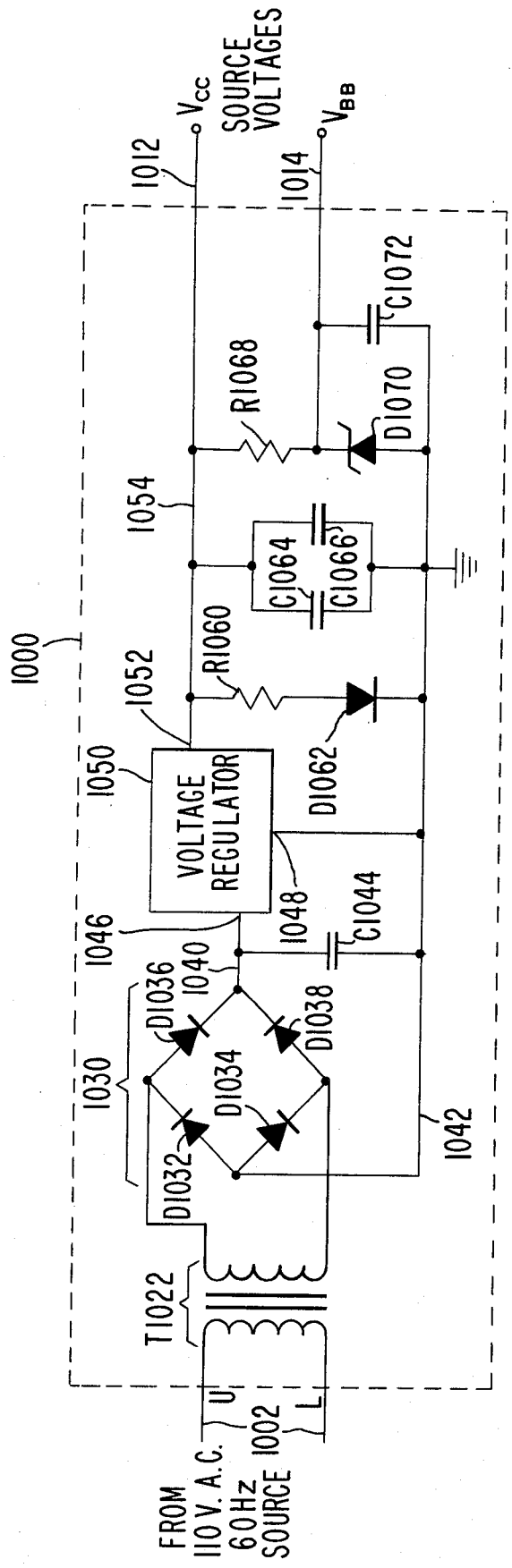
FIG. 12 is a circuit and block diagram of an embodiment of the power supply for use with the device of FIG. 2.

Audio amplifier circuitry 900, as illustrated in FIG. 11, receives internal signal S204 and produces (1) secondary output signal S902 on lines 902U/L which go to auxiliary broadcasting equipment 90 and (2) secondary output signal S904 on lines 904U/L which go to external electronic-to-acoustic transducer 92. Secondary output signals S902 and S904 are each electronic in nature and are each representative of an additive combination of first and second acoustic signals S23 and S25. Optional audio amplifier circuitry 900 comprises first-stage audio amplifier circuitry 910 and second-stage audio amplifier circuitry 940.

First-stage audio amplifier circuitry 910 receives internal signal S204 and produces (1) secondary output signal S902 which is an amplified audio signal and (2) another amplified audio signal on line 912. Audio amplification is provided by NPN transistor Q914 which is transformer-coupled through its collector to lines 902U/L. Transistor Q914 is driven by internal signal S204 through base resistor R916. The amplification gain of first-stage audio amplifier circuitry 910 is established by the ratio of resistor R916 and collector-to-base resistor R922. Emitter capacitor C920 to ground provides an A.C. bypass for the emitter of transistor Q914, so that the emitter of transistor Q914 is essentially at ground during A.C. signal amplification. Emitter resistor R918 to ground serves to provide a D.C. bias to transistor Q914. The collector load for transistor Q914 consists principally of transformer T924 with center tap 932 grounded. Transformer T924 matches the impedance of the collector of transistor Q914 to the input impedance seen on lines 902U/L from auxiliary broadcasting equipment 90. Typically, auxiliary broadcasting equipment 90 includes television audio broadcasting circuitry for sending second secondary output signal S902 to the television home audience. Typically, auxiliary broadcasting equipment 90 has an input impedance of 600 ohms and operates at a level of 0 DBM. Second-stage audio amplifier circuitry 940 through line 912 provides a relatively insignificant portion of the collector load on transistor Q914.

Responsive to the signal on line 912, second-stage audio amplifier circuitry 940 generates secondary output signal S904 which is an amplified audio signal. Audio amplification is provided by NPN transistor Q942 which is transformer-coupled through its collector to lines 904U/L. Base capacitor C944 A.C. couples the signal on line 912 to the base of transistor Q942. Resistor R946 to ground and resistor R950 from source voltage $V_{CC}$ provide a D.C. bias to the base of transistor Q942. Emitter resistor R948 to ground sets the gain of second-stage audio amplifier circuitry 940. Resistor R948 also provides a D.C. bias to the emitter of transistor Q942. The collector load for transistor Q942 consists of transformer T952. Transformer T952 matches the output impedance of the collector transistor Q942 to the input impedance seen on lines 904U/L from external electronic-to-acoustic transducer 92. Typically, external electronic-to-acoustic transducer 92 is an earphone set and associated signal conditioning circuitry utilized by the local speaker/listener or another individual in the vicinity of the local speaker/listener. Typically, external electronic-to-acoustic transducer 92 has an input impedance of 8 ohms.

Power supply 1000, as shown in FIG. 12, receives A.C. power on lines 1002U/L from a conventional A.C. house voltage source, and generates source voltage $V_{CC}$ on line 1012 and source voltage $V_B$ on line 1014 for use in device 20. Typically, the A.C. house voltage is at 110 volts and 60 hertz. Input transformer T1022 reduces the house voltage on lines 1002U/L. In a preferred embodiment, the power-line voltage is reduced to approximately 22 volts by transformer T1022. Rectifier bridge 1030, which is formed of diodes D1032, D1034, D1036, and D1038, full-wave rectifies the reduced A.C. voltage. Line 1040 leads from the positive side of rectifier bridge 1030, and line 1042 leads from the negative side of rectifier bridge 1030. The negative side of rectifier bridge 1030 functions as the ground signal reference. Capacitor C1044 filters the rectified signal from the positive side of rectifier bridge 1030. This filtered signal feeds into input terminal 1046 of integrated three-legged voltage regulator 1050. Ground terminal 1048 of voltage regulator 1050 leads through line 1042 to ground. Voltage regulator 1050 generates an output signal on line 1054 leading from output terminal 1052. Capacitors C1064 and C1066 serve to filter the output signal on line 1054 to eliminate A.C. variations. Power indicator LED D1062 provides an indication of the performance level of power supply 1000. Series resistor R1060 acts to limit the current through power indicator LED D1062. The principle output of power supply 1000 is D.C. source voltage $V_{CC}$, which is the filtered output signal from voltage regulator 1050. In a preferred embodiment, source voltage $V_{CC}$ is at a level of 12 volts.

The secondary output of power supply 1000 is D.C. source voltage $V_B$. In a preferred embodiment, $V_B$ is approximately 6 volts. Zener diode D1070 in combination with resistor R1068 reduce the $V_{CC}$ voltage down to the desired $V_B$ level. Filter capacitor C1072 filters the reduced voltage to produce source voltage $V_B$.

In a preferred embodiment, the various resistors have the values shown in Table I below. The resistances are indicated in kiloohms. For the variable resistors (or potentiometers), the numbers of turns are also indicated in Table I. Variable resistor P730 is a logarithmic potentiometer employed in the counter-clockwise mode.

TABLE I

| RESISTANCE VALUES | | | | | |
|---|---|---|---|---|---|
| RESISTOR | VALUE ($10^3$ ohms) | RESISTOR | VALUE ($10^3$ ohms) | RESISTOR | VALUE ($10^3$ ohms) |
| R123 | 0.30 | R294 | 430.0 | R652 | 0.10 |
| R125 | 0.30 | R295 | 910.0 | P710 | 10.0 |
| R133 | 18.0 | R318 | 8.2 | | (10 turns) |
| R134 | 22.0 | R320 | 0.47 | R711 | 22.0 |
| R135 | 18.0 | R324 | 220.0 | R712 | 10.0 |
| R137 | 10.0 | R328 | 470.0 | R714 | 150.0 |
| R141 | 0.56 | R332 | 18.0 | P720 | 10.0 |
| | | | | | (10 turns) |
| R153 | 62.0 | R334 | 43.0 | R721 | 22.0 |
| P154 | 10.0 | R338 | 82.0 | R722 | 10.0 |
| | (10 turns) | | | | |
| R156 | 22.0 | R340 | 62.0 | R724 | 150.0 |
| R157 | 22.0 | R354 | 22.0 | P730 | 10.0 |
| R162 | 1.0 | R356 | 18.0 | R824 | 15.0 |
| R234 | 10.0 | R416 | 20.0 | R825 | 1.0 |
| R235 | 30.0 | R420 | 1.0 | R827 | 33.0 |
| R236 | 15.0 | R422 | 130.0 | R833 | 470.0 |
| R243 | 3.3 | R426 | 270.0 | R835 | 56.0 |
| R246 | 130.0 | R454 | 39.0 | R837 | 27.0 |
| R247 | 130.0 | R456 | 22.0 | R864 | 33.0 |
| R253 | 2.7 | R514 | 15.0 | R865 | 1.0 |
| R256 | 24.0 | P534 | 5.0 | R866 | 1.0 |

TABLE I-continued

| RESISTANCE VALUES | | | | | |
|---|---|---|---|---|---|
| RESISTOR | VALUE ($10^3$ ohms) | RESISTOR | VALUE ($10^3$ ohms) | RESISTOR | VALUE ($10^3$ ohms) |
| | | | (10 turns) | | |
| R257 | 24.0 | R536 | 5.1 | R872 | 1.5 |
| R263 | 1.2 | R538 | 62.0 | R873 | 0.33 |
| R264 | 1.2 | R546 | 220.0 | R875 | 1.5 |
| R275 | 0.56 | R624 | 12.0 | R876 | 0.33 |
| R276 | 10.0 | R628 | 1.0 | R916 | 6.8 |
| R277 | 0.86 | R630 | 8.2 | R918 | 3.0 |
| R278 | 10.0 | R632 | 8.2 | R922 | 18.0 |
| R279 | 0.86 | R643 | 22.0 | R946 | 3.9 |
| R284 | 22.0 | R646 | 22.0 | R948 | 0.10 |
| R286 | 22.0 | R648 | 4.3 | R950 | 15.0 |
| R292 | 18.0 | R650 | 0.47 | R1060 | 1.0 |
| | | | | R1068 | 1.2 |

In a preferred embodiment, the capacitances for the various capacitors are given in Table II below. The capacitances are given in microfarads.

TABLE II

| CAPACITANCE VALUES | | | | | |
|---|---|---|---|---|---|
| CAPACITOR | VALUE ($10^{-6}$ farad) | CAPACITOR | VALUE ($10^{-6}$ farad) | CAPACITOR | VALUE ($10^{-6}$ farad) |
| C122 | 0.01 | C296 | 0.05 | C644 | 0.5 |
| C124 | 0.01 | C322 | 0.01 | C713 | 0.01 |
| C136 | 0.01 | C326 | 0.01 | C723 | 0.01 |
| C140 | 0.1 | C330 | 0.05 | C832 | 0.1 |
| C155 | 0.05 | C336 | 0.001 | C834 | 0.005 |
| C233 | 0.05 | C358 | 0.22 | C836 | 0.01 |
| C237 | 0.01 | C360 | 1.0 | C871 | 0.47 |
| C244 | 0.01 | C418 | 0.01 | C874 | 0.47 |
| C245 | 0.01 | C424 | 0.01 | C920 | 0.47 |
| C254 | 0.01 | C458 | 0.47 | C944 | 4.7 |
| C255 | 0.01 | C460 | 2.0 | C1044 | 2200.0 |
| C265 | 0.5 | C516 | 4.7 | C1064 | 0.1 |
| C283 | 0.05 | C548 | 0.01 | C1066 | 47.0 |
| C285 | 0.05 | C626 | 0.1 | C1072 | 22.0 |
| C293 | 0.00012 | | | | |

In a preferred embodiment, amplifiers A132, A314, and A316 are identical operational amplifiers formed in a single integrated circuit of the type designated by product number 3401 and manufactured by Fairchild Camera and Instrument Corp. (hereafter Fairchild). Amplifiers A152 and A282 are each integrated circuits such as those designated by product LM370N and made by National Semiconductor Corp. Amplifiers A232, A242, and A252 are identical operational amplifiers formed on a single integrated circuit such as that designated by product number µA3301 and manufactured by Fairchild. In employing integrated circuit µA3301, pin 7 is connected to ground and pin 14 is connected to source voltage $V_{CC}$. Amplifiers A291, A414, A512, and A831 are identical operational amplifiers formed on a single integrated circuit such as that designated by product number 3401 and made by Fairchild.

In a preferred embodiment, transistors Q161, Q262, Q642, Q822, Q823, Q862, Q914, and Q942 are each NPN devices such as those designated by product number PE8050 and made by Fairchild. Upon appropriate adjustment of polarities, PNP transistors could be substituted for the various NPN transistors in whole or in part.

In a preferred embodiment, diodes D138, D139, D352, D452, and D518 are each devices such as those designated by product number IN4148 and made by Fairchild. LED D826 is a device such as that designated by product number FLV310 and made by Fairchild. LED's D863 and D1062 are each devices such as those designated by product number FLV110 and made by Fairchild. Diodes D1032, D1034, D1036, and D1038 are each devices such as those designated by product number IN4001 and manufactured by Fairchild. Zener diode D1070 is a device such as that designated by product number IN4735 manufactured by Fairchild. Zener diode IN4735 has a rating of 6.2 volts.

For a preferred embodiment, transformer T272 is a device such as that designated by product number TY150X and manufactured by Triad-Utrad, Litton Systems Inc. Transformers T654 and T952 are each devices such as those designated by product number TA9 and manufactured by Stancor Electronics Corp. Transformer T924 is a device such as that designated by product number TA28 and made by Stancor Electronics Corp. Transformer T1022 is a device such as that designated by product number 2185 and manufactured by Coils, Inc.

In a preferred embodiment, voltage regulator 1050 is an integrated circuit such as that designated by product number 7812 and manufactured by Fairchild.

For a preferred embodiment, acoustic-to-electronic transducer 210 and electronic-to-acoustic transducer 660 are each devices such as those designated by product number 7644 and manufactured by E. and I. Manufacturing (Taiwan). Devices 7644 are 2.25-inch diameter transducers (or speakers) rated at 8 ohms and 100 milliwatts. Acoustic couplers 208 and 668 are a single device such as that designated by product number Model 90 and manufactured by Datel Corp.

Output device 80 is typically an electronic game such as that designated by product number FVE500 and made by Fairchild.

The resistors and capacitors listed in Tables I and II are conventional electronic elements manufactured according to well-known techniques. The various operational amplifiers, transistors, transformers, diodes, resistors, and capacitors are generally mounted on one or more printed circuit boards and appropriately interconnected according to conventional mounting and interconnection techniques known in the semiconductor art. Transformer T1022 is separately mounted so that it can be plugged into the house voltage source. Some of the LED's which function as indicators, such as LED's D826 and D1062, are mounted on one or more display/control panels. Also mounted on the display/control panel or panels are push-button switch 544, adjustment mechanisms for the variable resistors, and various other indicator and control mechanisms.

In a preferred embodiment, most of the electronic elements and components of device 20 are enclosed within a main housing with the display/control panel or panels on the outside of the main housing. Power supply 1000 is located within the main housing. Acoustic coupler 208 in conjunction with electronic-to-acoustic transducer 210 and part of the electronic circuitry of second means 200 and acoustic coupler 668 in conjunction with electronic-to-acoustic transducer 660 and part of the electronic circuitry of internal transformation means 600 are in a separate unit which is connected by an electronic cable to the main housing.

Although the electronic circuitry of the invention has been described as constructed largely with discrete components, the electronic circuitry could be built in several (and perhaps one) integrated circuits.

Device 20, as described for FIGS. 2–4, 5A, 5B, and 6–12, is operated in the following manner. Power supply 1000 is connected to a conventional power source at 110 volts and 60 hertz. Output device 80 is connected to line 802, and external acoustic-to-electronic transducer 31 is connected to lines 33U/L. Auxiliary broadcasting equipment 90 and external electronic-to-acoustic transducer 92 may be connected to lines 902U/L and lines 904U/L, respectively. The variable resistors are adjusted to give the proper sensitivity and response. In particular, variable resistor P534 is adjusted to establish the desired threshold sound level for activating output device 80 and, consequently, for causing amplifier A5120 in subtracting means 500 to go to the high state. Push-button switch 544 is subtracting means 500 can be used to test the response of device 20.

After having appropriately adjusted the various adjustment mechanisms on device 20, local telephone 61 is connected to acoustic couplers 208 and 668. During a telephone call, the local speaker/listener and the remote speaker/listener may engage in a conversation with the voice of the local speaker/listener being transmitted from external acoustic-to-electronic transducer 31 into which the local speaker/listener speaks to local telephone 61 by way of first means 100 and internal transformation means 600 of device 20. Output device 80 is appropriately prepared for actuation. At an appropriate time during the telephone conversation, the remote speaker/listener speaks sufficiently loudly that his/her voice which is converted into maintone signal S43 and subsequently fed, in modified form, into device 20 causes the primary output signal S502 of subtracting means 500 to go to the high state, thereby appropriately actuating output device 80. During the critical period when output device 80 is set for actuation, the local speaker/listener may continue the conversation with the voice of the local speaker/listener being converted into sidetone signal S66. Device 20 nullifies the effect of sidetone signal S66. Thus, the voice of the local speaker/listener is effectively cancelled so that output device 80 is not responsive to his/her voice.

While the invention has been described with reference to particular embodiments, the description is solely for the purpose of illustration and is not to be construed as limiting the scope of the invention claimed below. For example, output devices other than an electronic game may be used with the signal cancelling device. The band-pass amplifier circuitries within the first and second envelope detector circuitries might equivalently be defined as parts of the first and second means. Thus, various modifications, changes, and applications may be made by those skilled in the art without departing from the true scope and spirit of the invention as defined by the appended claims.

What is claimed is:

1. A device comprising:
   means for receiving a first input signal and for transforming said first input signal into a first intermediate electronic signal representative of said first input signal;
   means for receiving a second input signal and for transforming said second input signal into a second intermediate electronic signal representative of said second input signal;
   means for detecting the amplitude envelope of said first intermediate signal to produce a third intermediate electronic signal representative of the amplitude envelope of said first intermediate signal;

means for detecting the amplitude envelope of said second intermediate signal to produce a fourth intermediate electronic signal representative of the amplitude envelope of said second intermediate signal; and means for electronically subtracting said third intermediate signal from said fourth intermediate electronic signal to produce a primary output electronic signal indicative of the difference between said third and fourth intermediate signals.

2. A device according to claim 1 wherein:

said first input signal is representative of a first signal; and said second input signal is representative of an additive combination of said first signal and a second signal;

whereby said primary output signal is indicative of said second signal substantially independent of said first signal.

3. A device comprising:

means for receiving a first input signal representative of a first signal and for transforming said first input signal into (1) a first intermediate electronic signal representative of said first input signal and (2) a first internal electronic signal representative of said first input signal;

means for transforming said first internal signal into a first secondary output signal representative of said first internal signal;

means for receiving a second input signal representative of an additive combination of said first secondary output signal and a second signal and for transforming said second input signal into a second intermediate electronic signal representative of said second input signal;

means for detecting the amplitude envelope of said first intermediate signal to produce a third intermediate electronic signal representative of the amplitude envelope of said first intermediate signal;

means for detecting the amplitude envelope of said second intermediate signal to produce a fourth intermediate electronic signal representative of the amplitude envelope of said second intermediate signal; and means for electronically subtracting said third intermediate signal from said fourth intermediate electronic signal to produce a primary output electronic signal indicative of the difference between said third and fourth intermediate signals, whereby said primary output electronic signal is indicative of said second signal substantially independent of said first signal.

4. A device for use with a telephone that produces a telephone sidetone signal, said device comprising:

first means for receiving a first input signal representative of a first acoustic signal and for transforming said first input signal into (1) a first intermediate electronic signal representative of said first input signal and (2) a first internal electronic signal representative of said first input signal;

internal transformation means for transforming said first internal signal into a first secondary output signal receivable by the transmitter of said telephone, said first secondary output signal being representative of said first internal signal;

second means for receiving a second input signal transmittable from the receiver of said telephone and for transforming said second input signal into a second intermediate electronic signal representative of said second input signal, said second input signal being representative of an additive combination of said telephone sidetone signal and a telephone maintone signal transmittable through said telephone, said telephone sidetone signal being representative of said first secondary output signal, and said telephone maintone signal being representative of a second acoustic signal;

first envelope detector circuitry for detecting the amplitude envelope of said first intermediate signal to produce a third intermediate electronic signal representative of the amplitude envelope of said first intermediate signal;

second envelope detector circuitry for detecting the amplitude envelope of said second intermediate signal to produce a fourth intermediate electronic signal representative of the amplitude envelope of said second intermediate signal; and subtracting means for electronically subtracting said third intermediate signal from said fourth intermediate signal to produce a primary output electronic signal indicative of the difference between said third and fourth intermediate signals, whereby said primary output signal is indicative of said second acoustic signal substantially independent of said first acoustic signal.

5. A device according to claim 4 and further including output conditioning means for further conditioning said primary output electronic signal to transform it into a form suitable for output usage.

6. A device according to claim 5 wherein said second means is further operable for transforming said second input signal into a second internal electronic signal representative of said second input signal, and further including audio amplifier circuitry for receiving said second internal signal and generating a second secondary output signal which is electronic in nature and representative of said second internal signal, whereby said second secondary output signal is representative of an additive combination of said first and second acoustic signals.

7. A device according to claim 4 wherein:

said first secondary output signal is a third acoustic signal, and said internal transformation means comprises (1) first signal conditioning circuitry for transforming said first internal signal into a third internal electronic signal representative of said first internal signal, (2) a first transducer for converting said third internal signal into said third acoustic signal which is representative of said third internal signal, and (3) a first acoustic coupler connected to said first transducer and connectable to the transmitter of said telephone for carrying said third acoustic signal from said first transducer to the transmitter of said telephone;

said second input signal is a fourth acoustic signal, and said second means comprises (1) a second transducer for converting said fourth acoustic signal into a fifth intermediate electronic signal representative of said fourth acoustic signal, (2) a second acoustic coupler connected to said transducer and connectable to the receiver of said telephone for carrying said fourth acoustic signal from the receiver of said telephone to said second transducer, and (3) second signal conditioning circuitry for transforming said fifth intermediate signal into said second intermediate signal which is representative of said fifth intermediate signal.

8. A device according to claim 7 wherein:
said first input signal is electronic in nature, and said first means comprises third signal conditioning circuitry.

9. A device according to claim 8 wherein:
said first input signal comprises a first input direct current (D.C.) component and a first alternating current (A.C.) component, and said third signal conditioning circuitry comprises (1) attenuator circuitry for attenuating said first input D.C. component and (2) limiting amplifier circuitry for amplifying said first input A.C. component.

10. A device according to claim 9 wherein:
said first internal signal comprises a first internal D.C. component and a first internal A.C. component, and said first signal conditioning circuitry comprises (1) attenuator circuitry for attenuating said first internal D.C. component and (2) amplifier circuitry for amplifying said first internal A.C. component; and
said fifth intermediate signal comprises a fifth intermediate D.C. component and a fifth intermediate A.C. component, and said second signal conditioning circuitry comprises (1) amplifier circuitry for amplifying said fifth intermediate A.C. component and (2) impedance matching circuitry for attenuating said fifth intermediate D.C. component and matching the output impedance of said second means to the input impedance of said second envelope detector circuitry.

11. A device according to claim 4 or 8 wherein:
said first envelope detector circuitry comprises (1) a first envelope peak detector and (2) first band-pass amplifier circuitry for amplifying said first intermediate signal only within a specified first frequency range; and
said second envelope detector circuitry comprises (1) a second envelope peak detector and (2) second band-pass amplifier circuitry for amplifying said second intermediate signal only within a specified second frequency range.

12. A device according to claim 8 wherein:
said third signal conditioning circuitry includes first variable amplifier circuitry for amplifying said first intermediate signal; and
said second signal conditioning circuitry includes second variable amplifier circuitry for amplifying said second intermediate signal; and
further including gain control circuitry connected in common between said first and second variable amplifier circuitries for controlling the amplification gains of said first and second variable amplifier circuitries.

13. A device according to claim 4 wherein:
said subtracting means comprises differential comparator circuitry for operation in the saturation mode, said primary output signal being substantially equal (1) to a first selected value when said fourth intermediate signal exceeds said third intermediate signal by a threshold level value and (2) to a second selected value when said fourth intermediate signal does not exceed said third intermediate signal by said threshold level value.

14. A device according to claim 13 wherein said subtracting means further includes threshold control circuitry for producing and controlling said threshold level value.

15. A device according to claim 13 and further including output conditioning means for further conditioning said primary output signal to transform it into a form suitable for output usage, wherein:
said output conditioning means comprises keyed oscillator circuitry for transforming said primary output signal into a controlled tone at a selected frequency when said primary output signal equals said first selected value.

16. A device according to claim 15 wherein:
said output conditioning means further includes impedance matching circuitry for matching the output impedance of said output conditioning means to the input impedance of an external output device connectable to said output conditioning means.

17. A system comprising:
means at a first location for receiving a first acoustic signal from a person at said first location and for transmitting a first signal representative of said first acoustic signal;
means at a second location for receiving a second acoustic signal from a person at said second location and for transmitting a second signal representative of said second acoustic signal to said first location;
means at said first location for receiving said first and second signals and for transmitting a combined signal representative of an additive combination of said first and second signals;
means at said first location for generating an output signal indicative of said second signal in response to said first signal and said combined signal; and
output means activatable in response to receiving said output signal, whereby said output means is responsive to said second acoustic signal substantially independent of said first acoustic signal.

* * * * *